(12) United States Patent
Carrillo et al.

(10) Patent No.: US 7,742,436 B2
(45) Date of Patent: Jun. 22, 2010

(54) DISTRIBUTED NETWORKING AGENT AND METHOD OF MAKING AND USING THE SAME

(75) Inventors: Steve Carrillo, Norwell, MA (US); Paul Bristow, Narragansett, RI (US); Alan Stewart, Braintree, MA (US); Richard Stewart, Kingston, MA (US); William Kelley, Plymouth, MA (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 863 days.

(21) Appl. No.: 11/217,677

(22) Filed: Sep. 2, 2005

(65) Prior Publication Data

US 2006/0072505 A1 Apr. 6, 2006

Related U.S. Application Data

(60) Provisional application No. 60/606,431, filed on Sep. 2, 2004.

(51) Int. Cl.
*H04L 12/28* (2006.01)
(52) U.S. Cl. ............... 370/255; 370/254; 370/310; 370/351
(58) Field of Classification Search ............ 370/254, 370/395.2, 315, 316, 255, 310, 351; 455/3.01
See application file for complete search history.

(56) References Cited

U.S. PATENT DOCUMENTS

| 5,687,167 A * | 11/1997 | Bertin et al. ............... 370/254 |
|---|---|---|
| 6,072,994 A | 6/2000 | Phillips et al. |
| 6,115,580 A * | 9/2000 | Chuprun et al. ............... 455/1 |
| 6,130,875 A | 10/2000 | Doshi et al. |
| 6,266,694 B1 | 7/2001 | Duguay et al. |
| 6,339,587 B1 * | 1/2002 | Mishra ....................... 370/255 |
| 6,570,856 B1 * | 5/2003 | Freeburg et al. ......... 370/310.1 |
| 6,728,205 B1 * | 4/2004 | Finn et al. .................... 370/217 |
| 6,950,409 B1 * | 9/2005 | Kettinger .................... 370/258 |
| 7,133,410 B2 * | 11/2006 | Chow et al. ................. 370/404 |
| 7,286,489 B2 * | 10/2007 | Ades .......................... 370/254 |
| 7,386,007 B2 * | 6/2008 | Colombo et al. ............ 370/466 |
| 2003/0133420 A1 * | 7/2003 | Haddad ..................... 370/319 |
| 2003/0158925 A1 | 8/2003 | Unlacke |

(Continued)

OTHER PUBLICATIONS

International Search Report and the Written Opinion of the International Search Authority for PCT/US05/31296.

*Primary Examiner*—Jayanti K Patel
*Assistant Examiner*—Matthew Campbell
(74) *Attorney, Agent, or Firm*—Ingrassia Fisher & Lorenz, P.C.

(57) ABSTRACT

The present invention relates to an agent for distributed networking and a processor-readable software code. The agent may include, for example, a cosite analyzer, an EMI sniffer, an asset controller module, an asset discovery module, and a link negotiator. The agent may be configured to initiate and optimize network configurations for radio communications systems based on parameters. The software code may receive data associated with a network plan, may determine if any planned links are included in the network plan and may establish connectivity of a confirmed link between at least two nodes in the network. Additionally, the software code may determine if a non-planned link should be added to the network and may establish connectivity for the non-planned link based on a priority associated with the non-planned link.

16 Claims, 13 Drawing Sheets

U.S. PATENT DOCUMENTS

2004/0028003 A1* 2/2004 Diener et al. ............... 370/319
2004/0047324 A1* 3/2004 Diener ....................... 370/338
2004/0192221 A1* 9/2004 Matsunaga ................... 455/76
2006/0268738 A1* 11/2006 Goerke et al. ............... 370/254

* cited by examiner

Relay Administrator 1000

| | | | | | Relay 1 | Relay 2 | Relay 3 | Relay 4 | Relay 5 | Relay 6 | Relay 7 | Relay 8 | Relay 9 | Relay 10 | Relay 11 | Relay 12 | Relay 13 |
|---|---|---|---|---|---|---|---|---|---|---|---|---|---|---|---|---|---|
| These are minimum acceptable requirements. If relay does not meet these, the relay is unacceptable. | Radio Type | Relay is correct type of radio (i.e. UAV or satellite) | | | Yes | Yes | Yes | Yes | Yes | Yes | Yes | Yes | Yes | Yes | Yes | Yes | No |
| | Access List | Both Nodes are on Relay Access List | | | Yes | Yes | Yes | Yes | Yes | Yes | Yes | Yes | Yes | Yes | Yes | Yes | |
| | Node is Coverage Area | Node is within relay coverage area | | | Yes | Yes | Yes | Yes | Yes | Yes | Yes | Yes | Yes | Yes | Yes | | |
| | Start Time | Relay available at start time | | | Yes | Yes | Yes | Yes | Yes | Yes | Yes | Yes | Yes | Yes | No | | |
| | Minimum End Time | Relay available at minimum end time and then how long past minimum end time | | | | | | | | | | | | | | | |
| | Bandwidth | This is the minimum bandwidth required by the relay | | | Yes | Yes | Yes | Yes | Yes | Yes | Yes | Yes | Yes | No | | | |
| | Rejected Relay | These are relays that have been rejected by the RA but suggested by the node | | | Yes | Yes | Yes | Yes | Yes | Yes | Yes | Yes | No | | | | |
| | Rejected Frequencies | These are frequencies that cannot be used at Node due to interference or restricted use. | | | | | | | | | No | | | | | | |
| Any of these relays could be used. Algorithm is used to determine which one is the best. | Desired End Time | over 16 hrs extra - 10; 11-15 hrs extra - 8; 7-10 hrs extra - 6; 4-6 hrs extra - 4; 1-3 hrs extra - 2 | 13% | 9% | 6% | 4 | 2 | 6 | 8 | 2 | | | | | | | |
| | Node A Speed | Less than 15 km/hr - Low; Between 15 & 30 km/hr - Med; Greater than 30 km/hr - High | Low | Med | High | | | | | | | | | | | | |
| | Node A Location in Coverage Area | Within inner 25% of area - 10; Between 26 & 50% of area - 8; Between 51 & 75% of area - 5; Between 76 & 100% of area - 2 | 20% | 22% | 24% | 5 | 2 | 8 | 10 | 5 | | | | | | | |
| | Node B Speed | Less than 15 km/hr - Low; Between 15 & 30 km/hr - Med; Greater than 30 km/hr - High | Low | Med | High | | | | | | | | | | | | |
| | Node B Location in Coverage Area | Within inner 25% of area - 10; Between 26 & 50% of area - 8; Between 51 & 75% of area - 5; Between 76 & 100% of area - 2 | 20% | 22% | 24% | 10 | 5 | 8 | 2 | 8 | | | | | | | |
| | Relay Coverage Area | Greater than 5000 km² - 10; Between 2000 & 4999 km² - 8; Between 100 & 499 km² - 5; Less than 99 km² - 2 | 12% | 8% | 5% | 2 | 5 | 5 | 2 | 8 | | | | | | | |
| | Node A Speed | Less than 15 km/hr - Low; Between 15 & 30 km/hr - Med; Greater than 30 km/hr - High | Low | Med | High | | | | | | | | | | | | |
| | Node A Mobility Vector | No mobility - 10; Towards center - 8; Across area - 5; Out of area - 2 | 15% | 17% | 19% | 8 | 10 | 10 | 8 | 10 | | | | | | | |
| | Node B Speed | Less than 15 km/hr - Low; Between 15 & 30 km/hr - Med; Greater than 30 km/hr - High | Low | Med | High | | | | | | | | | | | | |
| | Node B Mobility Vector | No mobility - 10; Towards center - 8; Across area - 5; Out of area - 2 | 15% | 17% | 19% | 10 | 2 | 8 | 2 | 5 | | | | | | | |
| | Hop Count (initially, all similar relays will be 1 hop and will therefore have same hop count) | 1 Shared Asset - 10; 2 Shared Assets - 8; 3 Shared Assets - 5; Greater than 3 Shared Assets - 2 | 3% | 3% | 2% | 10 | 8 | 6 | 10 | 5 | | | | | | | |
| | Latency (initially, all similar relays will be 1 hop and will therefore have same latency) | Less than 200 msec - 10; Between 201 & 300 msec - 8; Between 301 & 500 msec - 5; Greater than 501 msec - 2 | 2% | 2% | 1% | 10 | 8 | 2 | 8 | 5 | | | | | | | |
| | | | 100% | 100% | 100% | 7.0 | 3.7 | 7.5 | 6.4 | 6.3 | | | | | | | |
| | | | | | | The higher the ranking the better the relay | | | | | | | | | | | |

FIG. 10

DISTRIBUTED NETWORKING AGENT AND METHOD OF MAKING AND USING THE SAME

CROSS REFERENCE TO RELATED APPLICATIONS

This application is a non-provisional application that claims the benefit of U.S. provisional patent application No. 60/606,431, filed Sep. 2, 2004 under 35 U.S.C. §119(e).

FIELD OF THE INVENTION

The present invention relates to an agent for distributed networking. Additionally, the invention relates to telecommunications system using a distributed networking agent and the hardware and software associated with such an agent.

BACKGROUND OF THE INVENTION

Ad hoc (or "on the fly") networks are known in the art. When forming such an ad hoc network for the transmission of data between various nodes in the network numerous problems associated with the connectivity, signal quality and the allocation of bandwidth in the system may arise. These and many other issues may be magnified when various nodes enter or leave the network at various points in time. Nodes may enter or leave networks due to, for example, network reconfiguration, the failure of a node, or any of a variety of other reasons.

Today's networks are capable of handling a broader spectrum of information services that may include video, graphics data, imagery, timely situational awareness updates, etc. In the context of ad hoc networks, the need for ubiquitous, timely and robust communications is complicated by limited communication spectrum, decreased footprint requirements and the need for rapid network reconfigurations. In many applications, communication networks may need to react to the conditions of the battle in real-time.

Networked waveforms, with the capability to self-form and self-heal, may provide only a limited solution to this problem. Rich radio connectivity over wide ranges can require multiple waveforms and multiple frequency bands over terrestrial Line of Sight ("LOS"), Unmanned Aeronautical Vehicles ("UAVs") and Satellites, for example. Various markets have developed a rich set of radios for communications that are applicable in different environments. Each waveform has advantages and disadvantages. Different environments (e.g., urban, forest and desert) and varied applications (e.g., terrestrial LOS, Satellite and UAVs) may require different waveforms. The choice of which waveform and frequency band may depend, for example, upon range, terrain, bandwidth and frequency reuse requirements.

What is needed is a system and method for the implementation of self-forming and self-healing networks. Additionally, what is needed is processor-readable software cord and associated hardware for network architectures that is configured to maintain a high degree of signal quality (e.g., quality of signal or QoS) while permitting various nodes to enter and leave the network in real-time. Additionally, what is needed is a network optimization algorithm that can mimic a network planner's intuition in the form of mathematical equations. These equations may be implemented as a distributed networking agent that includes processor-readable algorithms or software code for reconfiguring the network on the fly.

SUMMARY OF THE INVENTION

As the evolution of networking progresses, the desire or need to create networks that operate on higher frequencies may be exploited to allow flexible uses of waveforms and frequencies. An intelligent agent outside of the radio may use the radio resources to self-form and self-heal the network. This external agent may be configured to manage link connectivity and may be configured to simplify the use of directional antennas and shared assets in the network.

According to one exemplary embodiment of the invention, a processor-readable medium may include a processor-readable software code. The code may receive data associated with a network plan. The code may also determine if the network plan includes any planned links and may establish connectivity for a confirmed planned link between at least two nodes within a network based on the network plan. According to one embodiment of the invention, the code may determine if a non-planned link should be added to the network based on the network plan. The code may also be configured to establish connectivity for the non-planned link. The non-planned link may be associated with a mobile or static radio unit. The connectivity for the non-planned link may be based on a priority associated with the non-planned link.

According to another embodiment of the invention, a distributed networking agent ("DNA") may include a cosite analyzer module. The cosite analyzer module may be configured to interface with an EMI sniffer to determine spectrum availability within a network. The agent may include an asset controller module. The asset controller module may be configured to provide at least one of initialization and maintenance of network links based on spectrum availability. The agent may include an asset discovery module configured to detect the presence of a new node. The agent may also include a link negotiator module configured to determine whether to add an additional link to the network. The agent may also be configured to initiate and optimize network configurations for radio communication systems based on parameters.

According to another embodiment of the invention, a method may include the steps of receiving data associated with a network plan and determining if the network plan includes any planned links. The method may include the step of establishing connectivity for a planned link between at least two nodes within a network based on the network plan. The method may also include the step of determining if a non-planned link should be added to the network based on the network plan. The method may also include the step of establishing connectivity for the non-planned link. The non-planned link may be associated with a mobile or static radio unit. The connectivity for the non-planned link may be based on a priority associated with the non-planned link.

BRIEF DESCRIPTION OF THE DRAWINGS

FIG. 10 illustrates an exemplary relay administrator specification according to one embodiment of the present invention.

DETAILED DESCRIPTION OF THE INVENTION

The various embodiments of the invention will now be described more fully with reference the to the Figures in which exemplary embodiments of the present invention are shown. The subject matter of this disclosure may, however, be embodied in many different forms and should not be construed as being limited to the embodiments set forth herein.

One exemplary embodiment of the present invention may include a distributed networking agent. The distributed networking agent ("DNA") may include processor-readable software code that is configured to manage the network as various nodes exit and enter the network. Accordingly, the distributed networking agent may be configured to automate radio management associated with a node. Moreover the distributed networking agent may be configured to perform various resource management tasks across the network. The agent may be configured to respond to the changes in an ambient environment in real-time, thereby maintaining the radio network. The agent may be configured to manage the network based on a relative importance of data and nodes. Thus, the distributed networking agent may be configured to make prioritization decisions as needed in order to guarantee that certain high-priority data is communicated through the network properly.

In a network, resources should be allocated. These resources may include, for example, frequencies, satellite channels, relays, UAVs and nodes. The distributed networking agent may be configured to include a planner. This planner may be configured to rely upon data processing functions to plan and manage the network. This planner may be configured to utilize modeling and simulation algorithms to evaluate multiple courses of action and to gain confidence in the plan. The planner may be configured to obtain confidence by analyzing various scenarios using a simulator. According to an exemplary embodiment of the invention, the planning process may be configured to rely upon multiple iterations of planning, simulation and replanning.

Figure 1A:
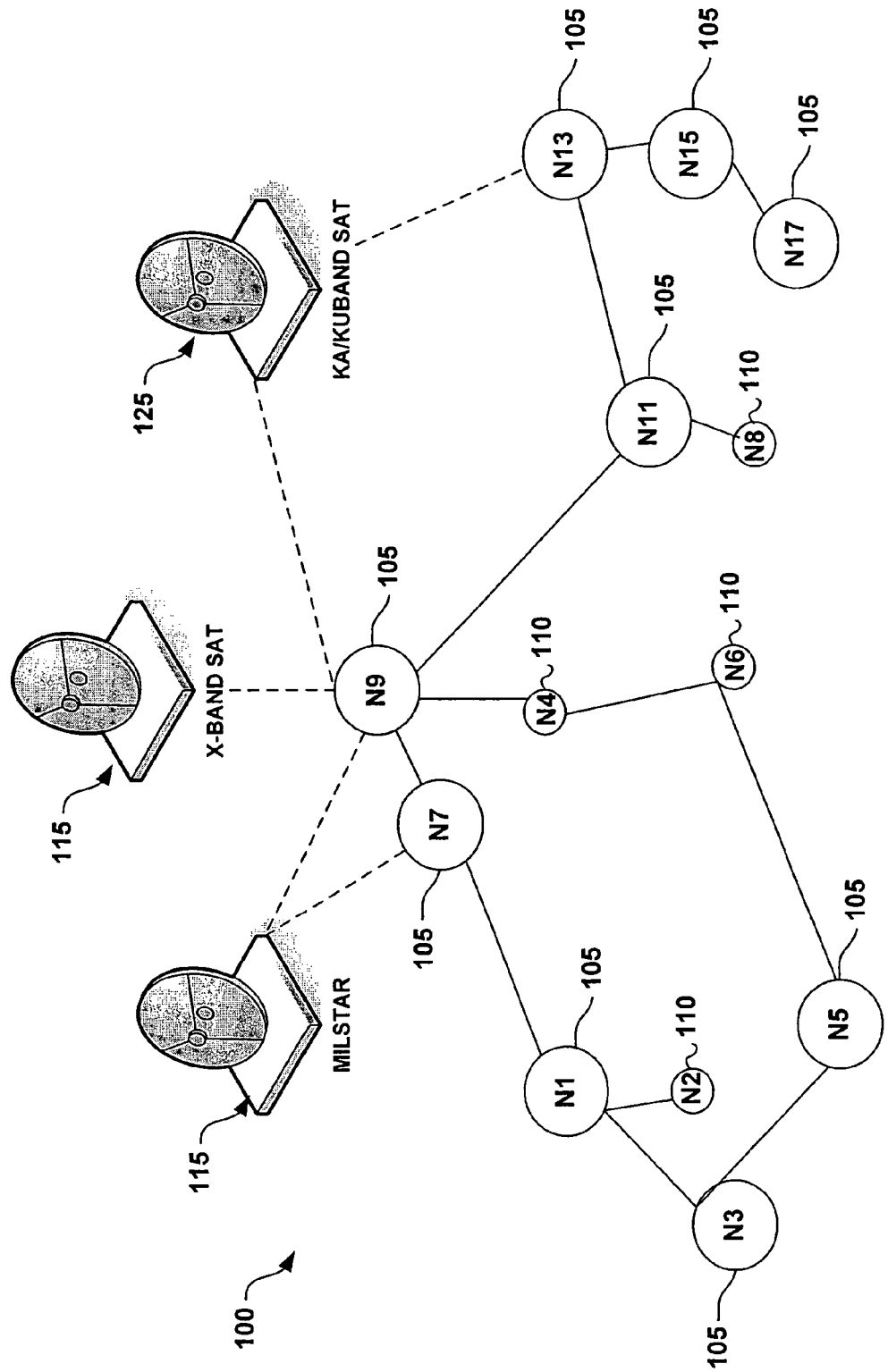
FIG. 1A shows an exemplary network topology according to one aspect of the present invention.

FIG. 1A shows an exemplary network topology 100 according to one aspect of the present invention. The network topology 100 may be configured to operate at a number of different communication frequencies. These various communication frequencies may be configured to facilitate communication between a number of different node types. According to one embodiment of the invention, the different nodes may have different communication equipment. For example, each node 105 (nodes N1, N3, N5, N7, N9, N11, N13, N15, N17) may be configured as a stationary site. This stationary site may include a transmission antenna. The transmission antenna may be, for example, a radio tower for communications purposes.

Each node 110 (N2, N4, N6, N8) may be a mobile communication device. Therefore, the nodes 110 may be configured to move from one location to another. The mobile communication device may include, for example, a hand-held radio. The hand-held radio may be configured to operate at one or more communications channels within the network.

The distributed networking agent according to the various embodiments of the invention may be located at each node 105, 110 within the network. For example, in one embodiment of the invention the network shown in FIG. 1A may be a self-forming and self-healing homogeneous or heterogeneous radio network that meets QoS/SOS requirements based on autonomous distributed agents within the network. The network may also include a number of satellite nodes 115, 125. These satellite nodes 115, 125 may be configured to uplink with various satellites to permit communication with other nodes. These satellites nodes 115, 125 may include satellites operating in, for example, the X-Band, or the Ka/Ku Band.

Figure 1B:
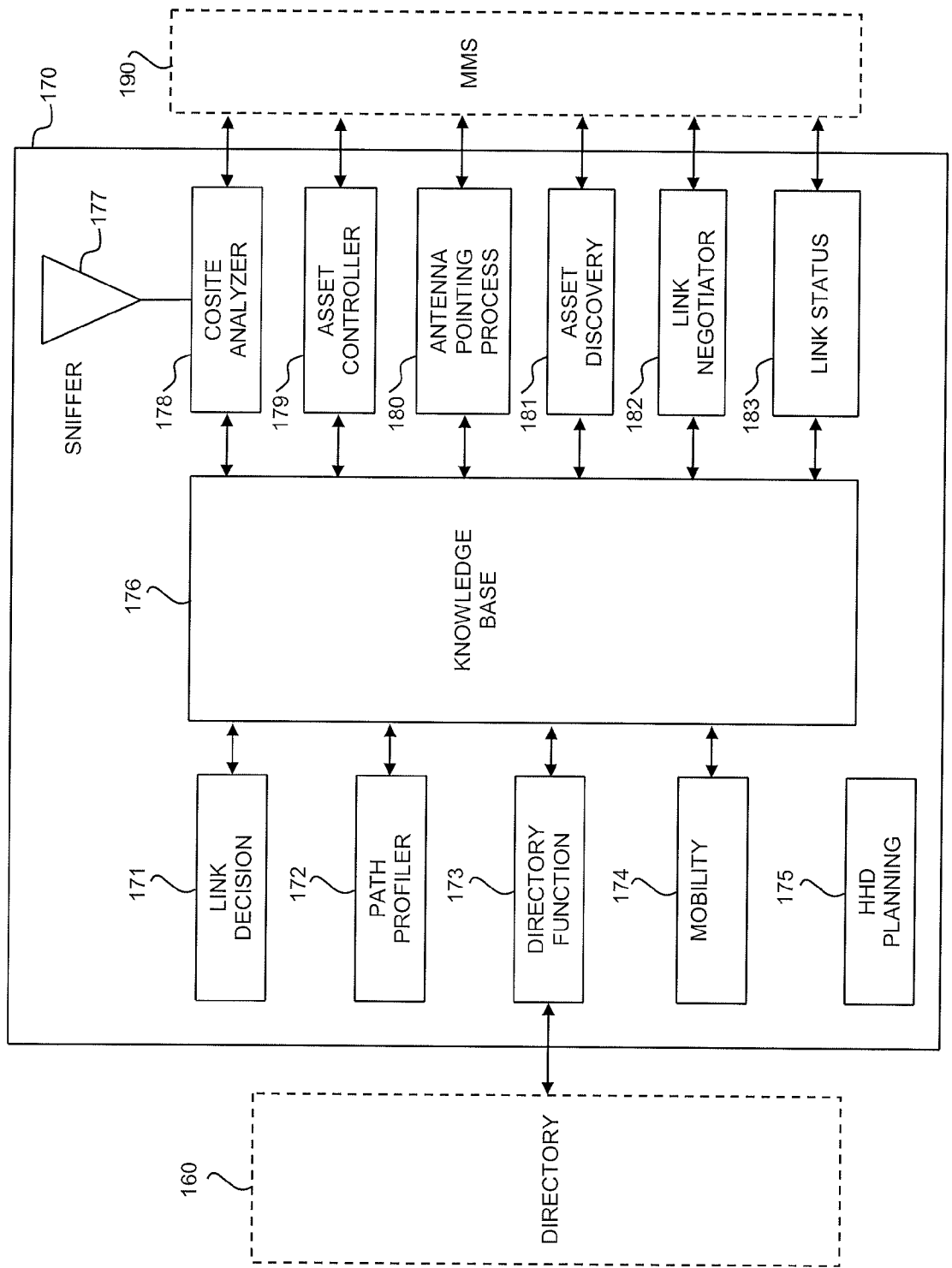
FIG. 1B shows a block diagram of an exemplary distributed networking agent according to an embodiment of the present invention.

FIG. 1B shows a block diagram of an exemplary distributed networking agent according to an embodiment of the present invention. By using various functionalities such as network planning and network monitoring and response tools, a programmable module, such as a network management module may be configured to capture the planner's intent and pass data related to the planner's intention on to the distributed networking agent 170.

As shown in FIG. 1B, the distributed networking agent may be configured to interface directly through the directory 160 interface. This interface may be configured to pass planning data and status on the radios, links, and topologies, for example. The directory 160 may be configured to be the repository for planning data and status data. The directory 160 may be configured to provide configuration data for the distributed networking agent 170 and may be configured to replicate status information between the various distributed networking agents in the network.

The distributed networking agent may also include a link decision module 171. The link decision module 171 may be configured to interface with the knowledge base 176 via an interface, such as, for example, a cognitive agent architecture (CAA) infrastructure. The link decision module 171 may be configured to perform most of the logic for the distributed networking agent 170. It may be configured to receive information from the other modules via the knowledge database 176. The link decision module 171 may be configured to use the information to make initial connectivity and optimization decisions. The distributed networking agent 170 may also be configured to include a path profiler module 172. The path profiler module 172 may be configured to receive tasks from the CAA infrastructure. The path profiler module 172 may be configured to report results to the knowledge base 176 via the CAA infrastructure. The path profiler module 172 may be configured to perform link predications using terrain data and radio propagation effects, for example.

The distributed networking agent 170 may also include a directory function module 173. The directory function module 173 may be configured to interface with the directory via the CAA. The directory function module 173 may be configured to perform the translation from the CAA infrastructure to the directory 160. A mobility module 174 may also be configured to interface with the knowledge base 176 via the CAA infrastructure. The mobility module may be configured to evaluate mobility associated with paths of the nodes and may be configured to determine if a particular node will go out of coverage or become blocked by foliage or terrain, for example.

According to yet another embodiment of the present invention, as shown in FIG. 1B, the distributed networking agent may also include a handheld device planning module 175. This module may be configured to interface with the knowledge base 176 via the CAA infrastructure. The HHD planning module may be configured to evaluate the performance of mobile equipment, such as, for example, cellular equipment. As described above, the knowledge base 176 may be configured to interface with other functions via the CAA infrastructure. The knowledge base 176 may be configured to be a repository of tasks and the data that are created from the tasks. Functions can create tasks for other functions or may be configured to receive results from the various other modules.

The distributed networking agent 170 may also be configured to include a sniffer module 177. The sniffer module may be configured to pass EMI environment results to the cosite analyzer module 178 via serial protocols. The sniffer module 177 may be configured to capture the EMI environment of the node. The distributed networking agent 170 may also be configured to include a Cosite analyzer 178 that may be configured to interface with the knowledge base 176 via the CAA infrastructure and may be configured to interface with a management system (MMS) 190 via standard management protocols, for example. The cosite analyzer module 178 may be configured to evaluate potential channels based on a current EMI environment as discovered by the sniffer module 177.

The distributed networking agent may also be configured to include an asset controller module 179. The asset controller module may be configured to interface with the knowledge base 176 via the CAA infrastructure and may also be configured to interface with the management system 190 via standard management protocols. The asset controller module 179 may also be configured to provide configuration data to radios in the network via the management system 190. The distributed networking agent 170 may also be configured to include an antenna pointing process module 180 that may be configured to interface with the knowledge base 176 via the CAA infrastructure and may also be configured to interface with the management system 190 via standard management protocols 190. The antenna pointing module 180 may include various algorithms and sensors to permit it to direct antennas based on current node locations and/or the direction and either distant target locations or satellite ephemeris.

The distributed networking agent may also include an asset discovery module 181 that may be configured to interface with the CAA infrastructure via the management system 190 via standard management protocols. The asset discovery module 181 may also be configured to receive information from distant nodes and may be configured to report the information received to the knowledge base 176. Additionally, the DNA according to an exemplary embodiment of the present invention may also include a link negotiator module 182. The link negotiator module 182 may be configured to interface with the knowledge base 176 via the CAA and may be configured to interface with the management system 190 via standard management protocols. The link negotiator module 182 may be configured to coordinate with far end nodes to determine radio configurations required to bring an additional radio into the network, for example. Additionally, the DNA 170 may also include a link status module 183. The link status module may be configured to interface with the knowledge base 176 via a CAA infrastructure and may be configured to interface with the management system 190 via standard management protocols. The link status module may be configured to read status information from the radios via the management system 190 and may be configured to generate a report for the knowledge base 176 based on the status. The management system 190 may be configured to interface with the CAA infrastructure via standard management protocols. The management system 190 may be, for example, the point of control for the radio subsystem.

Figure 2:
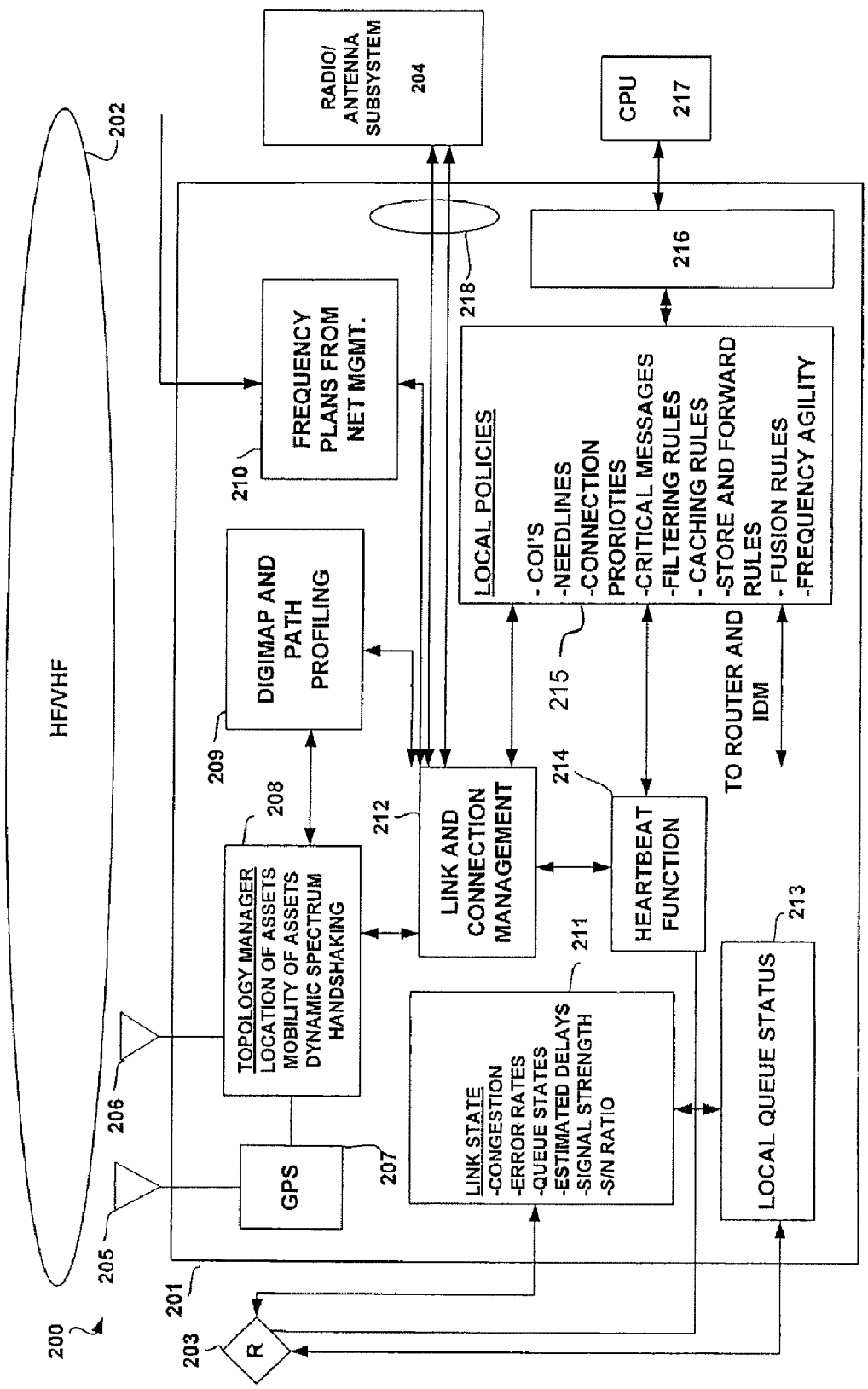
FIG. 2 shows an exemplary flow of information according to one exemplary embodiment of a distributed networking agent.

As shown in FIG. 2, an exemplary embodiment of the present invention may include a DNA in a communication node 200. The DNA portion is represented generally as 201. As shown in FIG. 2, the HF/VHF 202 may be configured to interface via serial data communications with a topology manger. The HF/VHF or lower TI may be configured as the control plane for out-of-band communications. The router 203 may be configured to interface with the link state module via standard management interfaces. The router 203 may be configured to provide a number of routing functions. According to an exemplary embodiment of the present invention, the router 203 may provide three routing functions. The DNA 201 may also include a radio and antenna subsystem 204 that may be configured to interface to the DNA 201 via standard management interfaces. This includes a subset of the equipment that may be managed by the DNA 201. There may also be a number of different antennas including, for example, a GPS antenna 205 and/or a control plane antenna 206. The GPS antenna 206 may be configured to interface with a global positioning system receiver 207. The DNA 201 may also include a topology manager module 208 that may be configured to interface with other DNA functions via the CAA infrastructure. The topology manager module 208 may be configured to track node location and mobility.

The DNA 201 may also include a path profiling and digi-map module 209 that may be configured to interface with the CAA infrastructure. This path profiling module 209 may be configured to perform link prediction functions using terrain data and radio propagation effects using digital maps, for example. The DNA may be configured to include a frequency planning module 210 and may be configured to interface with other DNA functions via the CAA infrastructure. The frequency planning module 210 may be configured to plan from network management to provide the preplanned resources for the network administrator system to the DNA 201. The DNA 201 may also include a link state function 211. The link state function 211 may be configured to interface with other DNA functions via the CAA infrastructure. The link state function 211 may be configured to read status information from the various radios in the network via a management system and may be configured to generate a report for the knowledge base. The link and connection management module 212 may be configured to interface with other DNA functions via the CAA infrastructure. The link and connection management module 212 may be configured to coordinate with remote nodes to determine radio configurations required to bring a particular radio into the link. The DNA 201 may also include a local queue status module 213 that may be configured to interface with the router 203 via standard management protocols and may also be configured to interface with the other DNA modules and functions via the CAA infrastructure. The local queue status module 213 may be configured to receive traffic information from the router 203.

The DNA 201 may also include, for example, a heartbeat function module 214. The heartbeat function 214 may be configured to interface with other DNA functions via the CAA infrastructure. The heartbeat function module 214 may be configured to send periodic pulses to the network to detect activity on the network. The DNA 201 may also include a local policies module 215. The local policies module 215 may be configured to interface with the network administrator system via, for example, a MAMA XFACE 216. This local policies module may be configured to include information from the network administrator system 217 regarding policies and behavior for the various DNA algorithms. The MAMA XFACE 216 interface is a standard management interface and may be replaced by any suitable standard management interface. This interface 216 may be configured to provide an interface between the network administrator system 217 and the DNA 201. As shown in FIG. 2, the DNA may be configured to include several virtual interfaces that may be implemented as a single interface 218.

Figure 3:
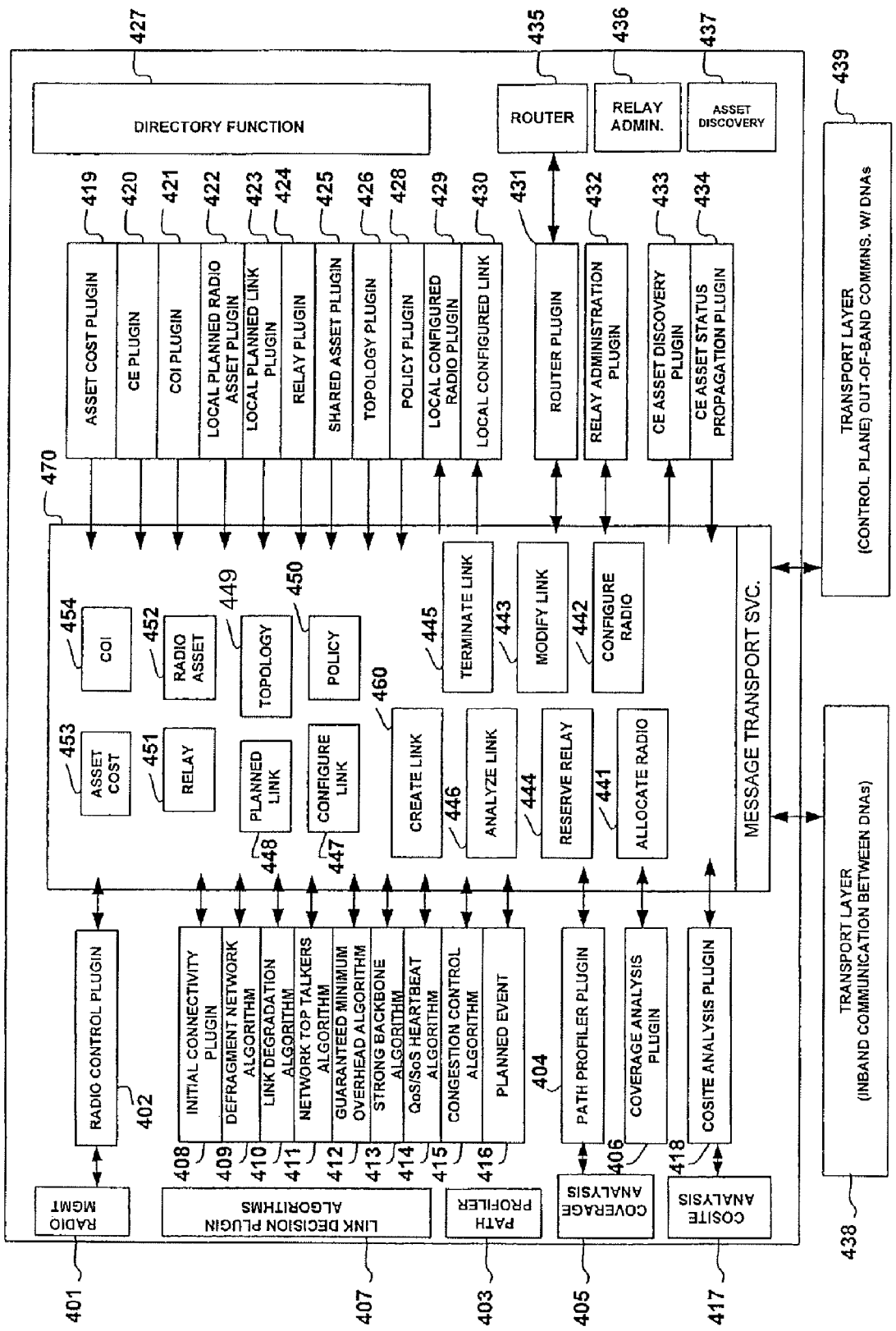
FIG. 3 shows the distributed networking agent integrated into the COUGARR framework with the interfaces of the current implementation according to one embodiment of the present invention.

As shown in FIG. 3, the distributed networking agent 400 may be configured to include a radio management module 401 that may be configured to use standard management protocols to interface with, for example, a CAA infrastructure. The radio management module 401 may be configured to format configuration and status data for the radio subsystem. The radio management module 401 may be configured to interface with the CAA using a radio control plugin 402 that may be configured to generate configurations for the radio subsystem. The DNA 400 may also include a path profiler module 403 that may be configured to interface with the DNA via standard protocols. The path profiler module 403 may be configured as a tool that calculates path loss for radio links using propagation effects and terrain effects. The path profiler module 403 may be configured to interface with the CAA infrastructure via a path profiler plugin 404. The path profiler plugin 404 may be configured to generate tasks for the path profiler 404 and may be configured to receive results from the path profiler module 403. The DNA 400 may also include a coverage analysis tool 405 that may be configured to interface with the CAA. The coverage analysis tool 405 may be configured to calculate a path loss for radio links using propagation effects and terrain effects, for example. The coverage analysis tool 405 may be configured to interface with the CAA via a coverage analysis plugin 406. The coverage analysis plugin 406 may be configured to generate a task for the path profiler and may be configured to receive the results from the path profiler 406. The DNA 400 may also be configured to include a number of additional plugins. These plugins may include, for example, a link decision plugin 407 that may be configured to select an appropriate link decision algorithm for a selected task. Additionally or in the alternative, the initial connectivity plugin 408 may be configured to communicate with the CAA and may be configured as a link decision algorithm for unconnected nodes. The DNA 400 may also include a defragment network algorithm 409. The defragment network algorithm 409 may be configured as a link decision algorithm for networks that have become fragmented due to lost links, as will be discussed in more detail below. The DNA 400 may also include, for example, a link degradation algorithm 410. The link degradation algorithm 410 may be configured as a link decision algorithm that detects when a link's performance falls below a threshold due to, for example, network congestion, bit error rate ("BER") or latency. The DNA 400 may also include a network top talkers (NTT) algorithm 411. The NTT algorithm 411 may be configured as a link decision algorithm that determines the largest source and sink of traffic and attempts to connect these sources with a direct connection. The DNA 400 may also include a guaranteed minimum overhead (GMO) algorithm 412. This GMO algorithm 412 may be configured as a link decision algorithm that attempts to minimize the overall cost based on factors such as number of hops, over latency, or jitter. This may be performed for the entire network by adding additional links.

The DNA 400 may also include a strong backbone algorithm. The strong backbone algorithm 413 may be configured to evaluate the network for points where a losing single link or node may cause fragment and attempt to strengthen the network by adding additional links. The DNA 400 may also include a QoS/SoS heartbeat algorithm 414. This algorithm may be configured to test the network for quality of service (QoS) and speed of service (SoS) in order to make link changes. The DNA 400 may also include a congestion control algorithm 415. The congestion control algorithm 415 may be configured as a link decision algorithm that determines bottlenecks or points of congestion in the network and augments them with additional links. Another exemplary module or algorithm may include, for example, a planned event module 416. The planned event module 416 may be configured to be a link decision algorithm that allows the planner to have positive control an force a link decision.

The DNA 400 may also include a cosite analysis module 417. The cosite analysis module may be configured as a tool that can provide analysis of interference caused by, for example, having multiple radios on a single node. The cosite analysis module 417 may interface with the CAA via a cosite analysis plugin 418. The costite analysis plugin 418 may be configured to format commands and results for the cosite analysis tool. The DNA 400 may also include an assert cost plugin 419. The asset cost plugin 419 may be configured to interface with the CAA infrastructure. Moreover, the asset cost plugin 419 may be configured to calculate relative costs of different resources (e.g., satellites, radio channels and relays) used by the DNA 400. The DNA 400 may also include a CE plugin 420. This CE plugin 420 may be configured to interface with the CAA and may also be configured to carry configuration information for the communication element (e.g., a node) that the DNA 400 resides within. The DNA 400 may also include a COI plugin 421. The COI plugin 421 may be configured to interface with the CAA and may also be configured to calculate matrics on planned data concerning historic traffic flows. The COI plugin 421 may also be configured to determine a propensity of one node to communicate with another node. The DNA 400 may also include a local planned radio asset plugin 422. The local planned radio asset plugin 422 may be configured to contain information about radio assets contained by the node in which the DNA 400 resides. These may be local assets that are under the control of the DNA 400. The DNA 400 may also include a local planned link plugin 423. The local planned link plugin 423 may be configured to communicate with the CAA infrastructure any may also be configured to contain information about the preplanned links for a node.

The DNA 400 according to an exemplary embodiment of the invention may also include a relay plugin 424. The relay plugin 424 may be configured to include information regarding the relay assets that are preplanned and the DNA 400 may be configured to use in its link decisions. The DNA 400 may also include a shared assets plugin 425. The shared assets plugin 425 may be configured to interface with the CAA infrastructure and may also be configured to include information about resources that may be shared among multiple DNAs in the network. These may include, for example, satellite channels and unmanned aeronautical vehicles ("UAV") channels, for example. The DNA 400 may also include a topology plugin 426. The topology plugin 426 may be configured to interface with the CAA infrastructure and may also be configured to evaluate link information in order to create a network topology. The link decision algorithms may utilize the topology plugin 426 to evaluate strengths and weaknesses of the network. The DNA 400 may also include a directory 427. The directory 427 may be configured to be the repository for planning data and/or status data. It may provide configuration data to the DNA 400 and may be configured to replicate status information between DNAs. The DNA 400 may also include a policy plugin 428. The policy plugin may be configured to include and store information related to a network plan or network policy. The network plan may be used to affect the link decision behavior. Moreover, the DNA 400 may be configured to include a local configured radio plugin 429. The local configured radio plugin 429 may be configured to include current configuration data associated with the configuration of the local radios. The DNA may also include, for example, a local configured link plugin 430 that may be configured to communicate with the CAA infrastructure. Moreover, the local configured link plugin 430 may be configured to include information related to the all of the links for the node that the DNA 400 resides within. The DNA 400 may also include a router plugin 431 that may be configured to interface with the CAA infrastructure 440. Moreover the router plugin 431 may be configured to format router configurations and router status information. Additionally, the DNA 400 may include a relay administrator plugin 432. The relay administrator plugin 432 may be configured to calculate the relative value of the potential relays and may also be configured to evaluate and chose the best potential relay.

The DNA 400 may also be configured to include a CE asset discovery plugin 433. The CE asset discovery plugin 433 may be configured to interface with the CAA and may also be configured to format information received from distant nodes, after the distant nodes have been located. Moreover, the CE asset discovery plugin 433 may be configured to publish the data received. The DNA 400 may also be configured to include a CE asset status propagation plugin 434. The CE asset propagation plugin 434 may be configured to format data about the status of remote nodes and may publish this data.

The DNA 400 may also be configured to include a router plugin 435. The router plugin 435 may be configured to interface with the router via a standard management protocol. The router 435 may be a standard commercial router and may be configured to perform 3-layer functions, for example.

The DNA 400 may also be configured to include a relay administrator 436. The relay administrator may be a local or remote DNA, for example, that may become the point of authority for a shared asset. This relay administrator 436 may have the final decision on which nodes can use or cannot use relays, satellites, or UAVs for example. The DNA 400 may also include an asset discovery module 437. The asset discovery module 437 may be configured to send out messages to be discovered by remote nodes. The DNA 400 may also include transport plugins 438, 439 that relate to in-band and out-of-band communications, respectively. The CAA infrastructure may also include a number of storage devices or databases 470 such as, for example, an allocate radios storage or database 441 that may be used to acquire radio information and take them under the control of the DNA 400. Moreover, the CAA may include a configure radio storage 442 that may be responsible for configuring radios with initialization data. Other data storage and data stored therein may include, for example, a modify link storage 443 (changes a link to a lower or higher bandwidth, lower or high powers); a reserve relay storage 444 (negotiates the use of a relay at a future point in time; relay may be used when the create link task is applied); terminate link storage 445 (negotiates termination of a link between two nodes); analyze link storage 446 (cause a potential link to be evaluated for path profiling, coverage analysis, and cost analysis); configure link storage 447 (data about the links that exist in the network); planned link storage 448 (data about planned links in the network); topology storage 449 (data about network topology); policy storage 450 (data about network topology); relay storage 451 (data about the relays in the network); radio asset storage 452 (data about radios in the network); asset costs storage 453 (data about the relative costs of communications assets, frequencies, satellites etc.); COI storage 454 (data about community of interest; may include tables about historic data flows through the network); and create a link storage 460 (data related to negotiations of frequencies, data rates and power level between distant nodes).

Figure 4:
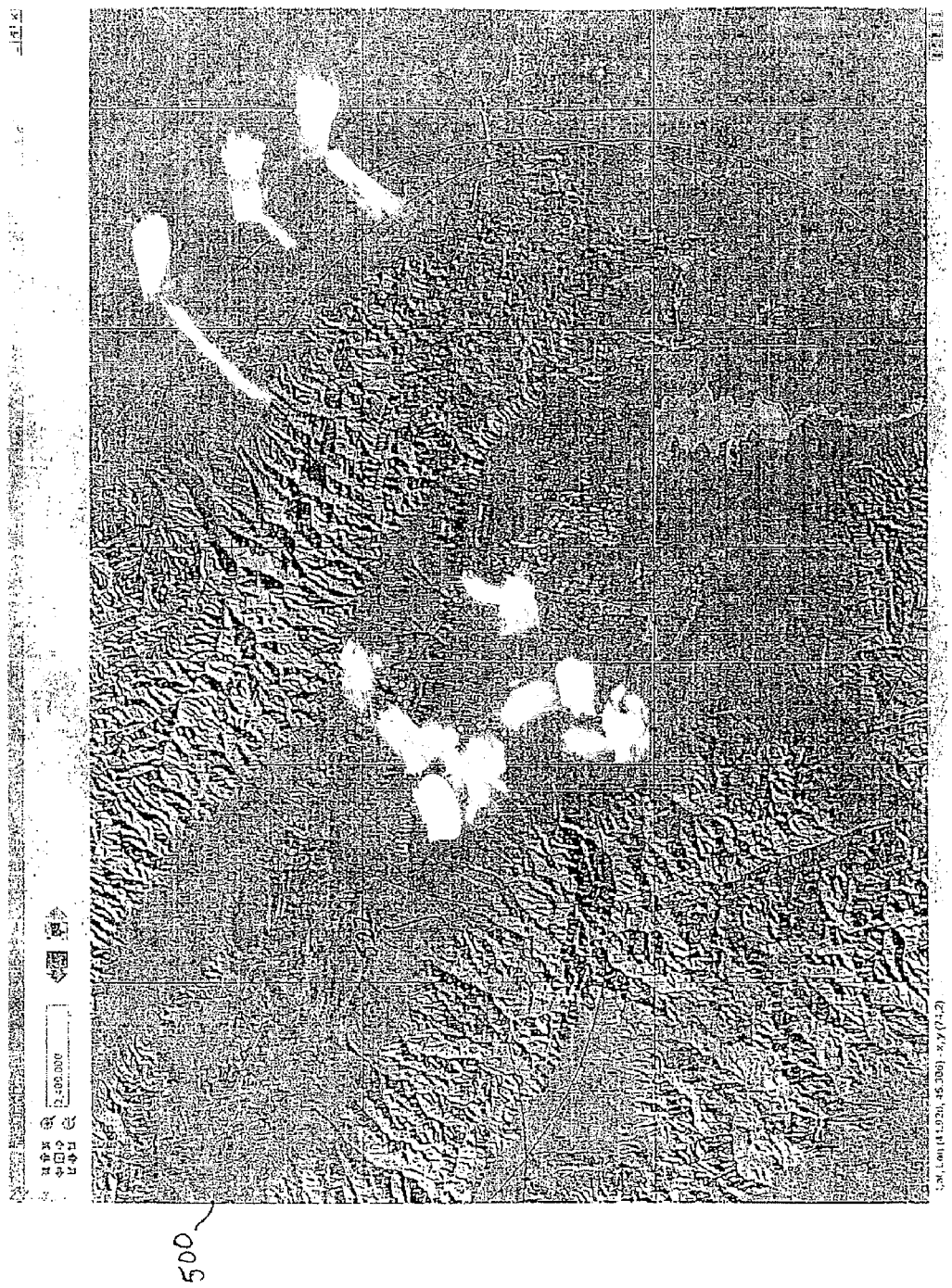
FIG. 4 shows an example of the coverage analysis performed by the distributed networking agent according to one embodiment of the present invention.
Figure 5:
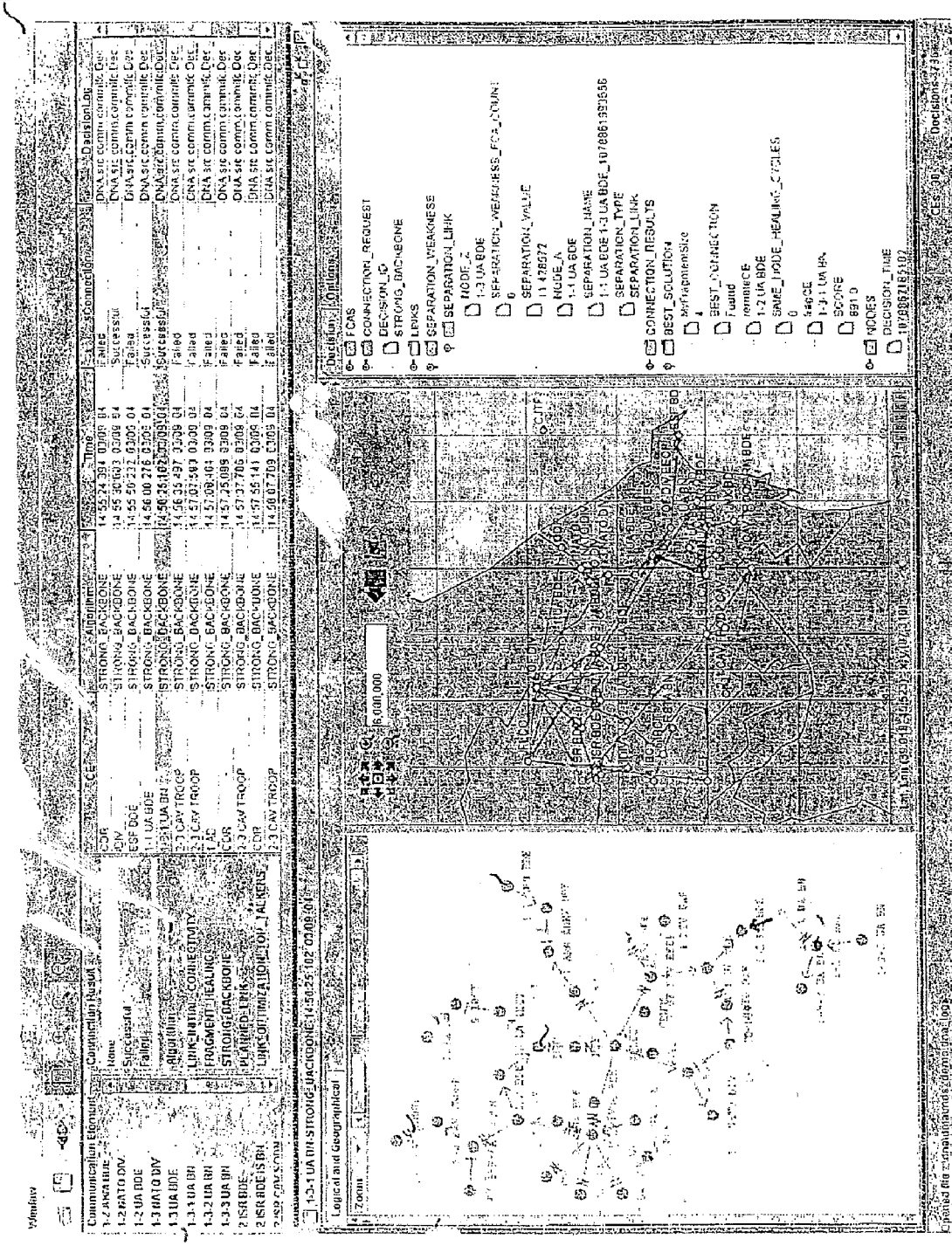
FIG. 5 shows a screen capture of the distributed networking agent engineering analysis tool used to evaluate the link decisions in a simulation according to one embodiment of the present invention.
Figure 6:
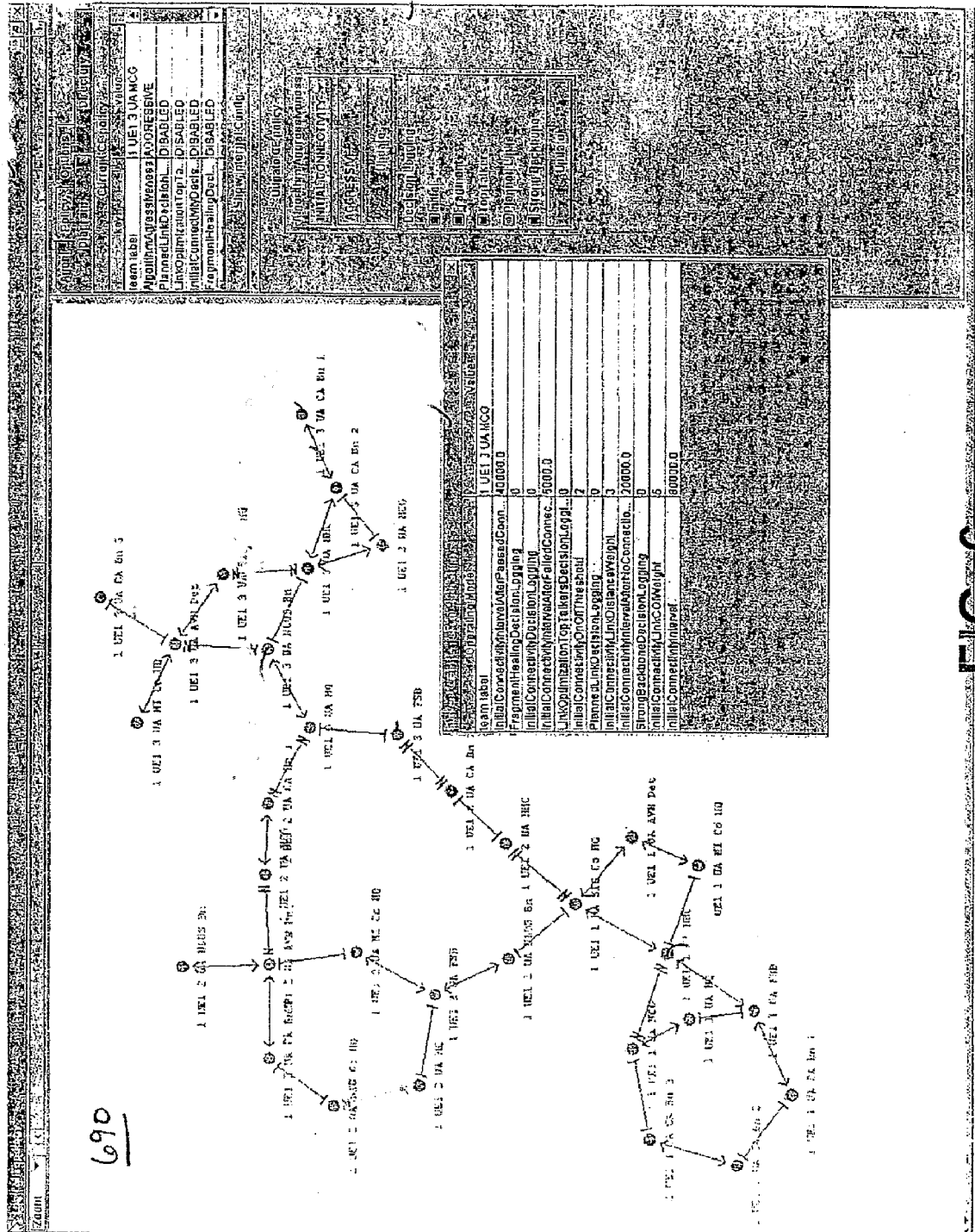
FIG. 6 shows an initial concept for the policy implementation according to one embodiment of the present invention.

FIGS. 4-6 show some exemplary screen shots of a GUI that may be used in connection with the present invention.

Figure 7:
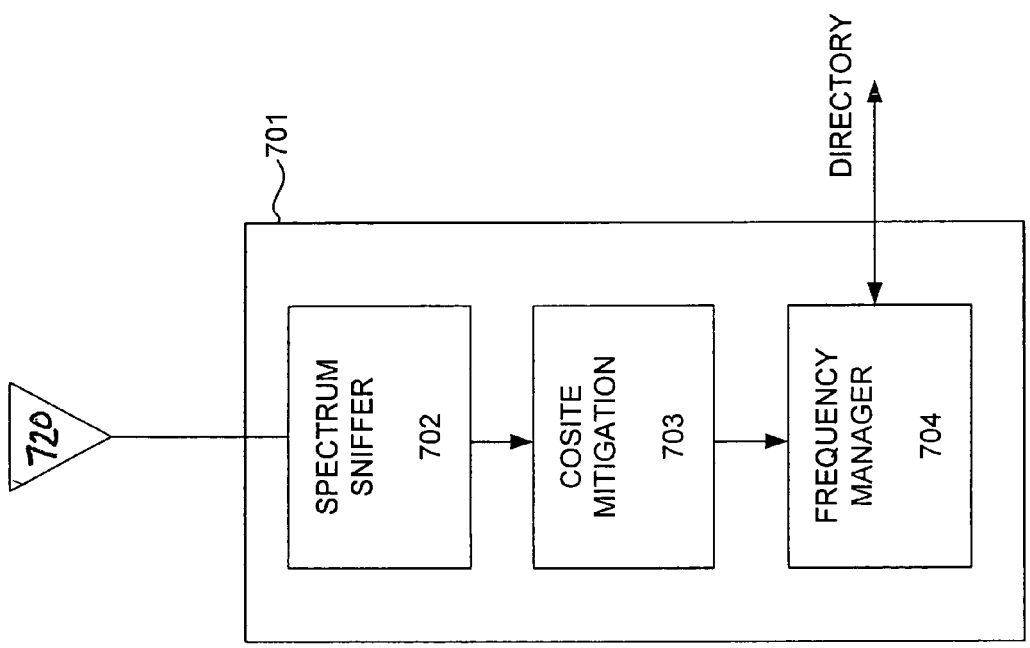
FIG. 7 illustrates an EMI sniffer according to one embodiment of the present invention.

FIG. 7 shows a high level picture of the Cosite Mitigation System 701. This system may be configured to use a combination of analysis, such as, for example, Cosite Mitigation 703 and measured electromagnetic interference ("EMI"). The measurement of the EMI may be performed by Spectrum Sniffer 702. The system couples off the communication antennas 720 and may perform spectrum analysis function to determine the location of interference within the potential radio channels. This information may permit a frequency manager to rate potential channels relative to cosite performance.

Figure 8:
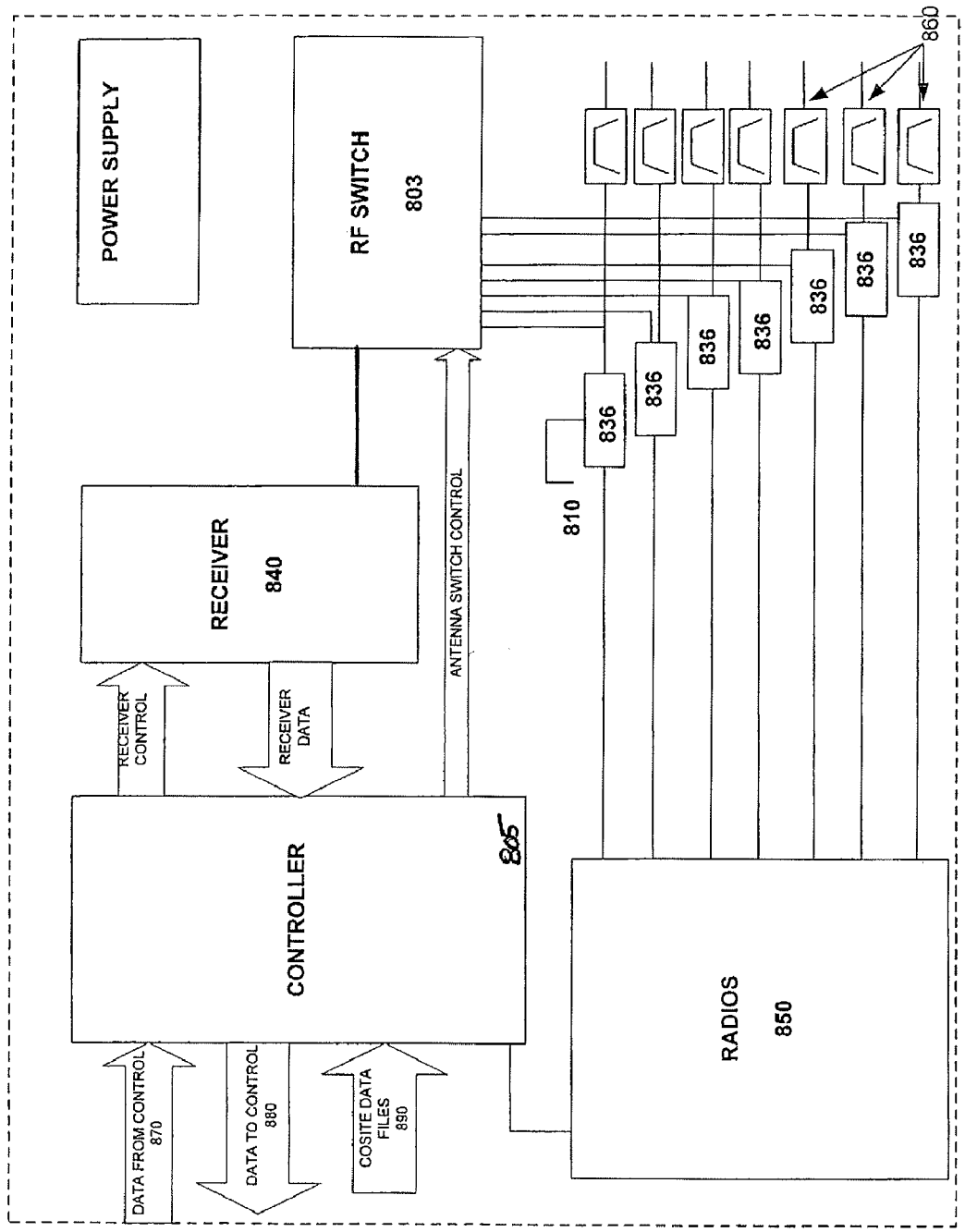
FIG. 8 illustrates an EMI sniffer according to a second embodiment of the present invention.

FIG. 8 is a detailed version of the functional blocks shown in FIG. 7. Band pass filters 860 may be configured to tune the antennas to a particular band or channel. Couplers 836 may permit the RF switch 803 to control the inputs/outputs to and from the radios 850. The RF switch 803 may be grounded using ground 810. Data may be input to and output from the controller 805. Controller 805 may be configured to run the analysis software of the present invention. The basic flow the antennas signals may be coupled off and sent to the receiver 840 via RF switch 803. On command from the DNA cosite function, the switches may be sent to the antenna of interest. The receiver 840 may be tuned through a series of channels and the amount of interference energy per channel is sent to the controller 805. The controller 805 may use this measured data and the analysis data to rank each potential channel. As shown in FIG. 8, control data 870 may be received from the DNA. The cosite function analysis data 880 may be output to the DNA, and cosite data files 890 may be uploaded and used for the analysis function in controller 805.

Figure 9:
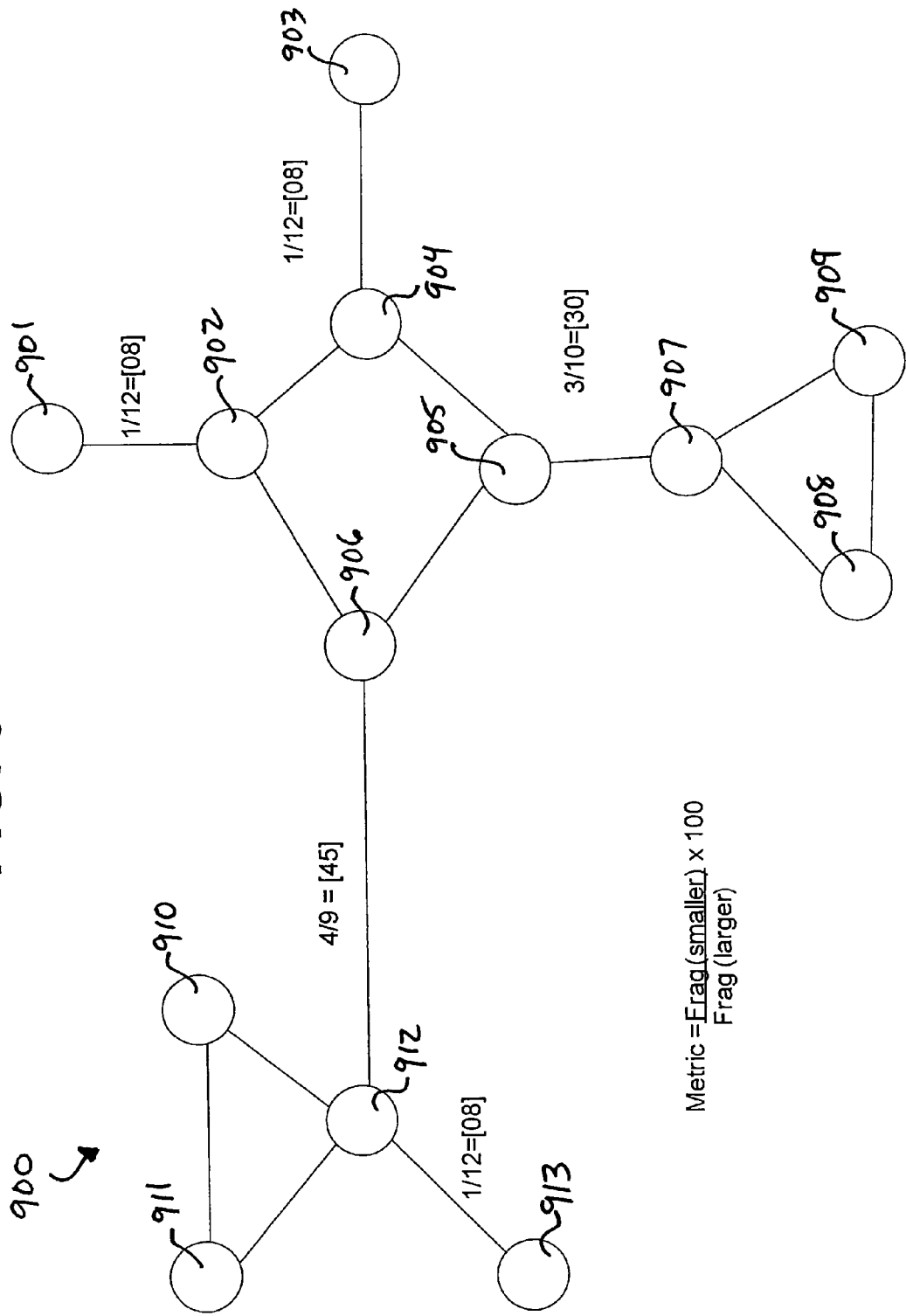
FIG. 9 illustrates separation links according to one embodiment of the present invention.

FIG. 9 shows how the strong Backbone Link Decision Algorithm works. Here each circle may represent, for example a node 901, 902, 903, 904, 905, 906, 907, 908, 909, 910, 911, 912, 913 in a network 900. The lines between nodes represent radio links. The algorithm may evaluate each link. The algorithm may be configured to delete the link from the topology and to determine if the network is fully formed (i.e., can every node in the network still reach every other node in the network?). If the resulting topology is broken, this link becomes a "separation" link. Next the algorithm quantifies each separation link in order to determine which (if the link were lost) would have the biggest impact over the entire network performance. It may do this by adding the number of nodes in the smaller fragment and dividing by the number of nodes in the larger fragment and multiplying by 100. Losing the link from a stub node like 903, with a value of 08, has a smaller impact than losing the link between nodes 912 and 906 with a value of 45.

FIG. 10 is a depiction of one of the DNA weighting functions 1000. It demonstrates that there are two types of tests, go/no go tests and weighted test. The flow goes like this:

A node wants to use a relay

Each potential relay is tested for Go/No go criteria (1020)

Does this relay provide appropriate coverage? (can the nodes see it?)

Can this relay support the minimum bandwidth?

Then, those of the relays that pass the go/no go test are rated to determine which relays are best 1030.

Does it provide great, good or medium coverage for the node?

Is the node moving into the coverage area or out of the coverage area?

Does it have latency characteristics that match the nodes needs?

Each relay is weighted with a value and returned to the DNA for selection.

1050 shows an example of answers for a fictional set of relays. 1040 shows some quantitative results for a fictional set of relays.

Of course, this is one exemplary DNA weighting function, and many other variations upon this function will be readily appreciated.

Figure 11:
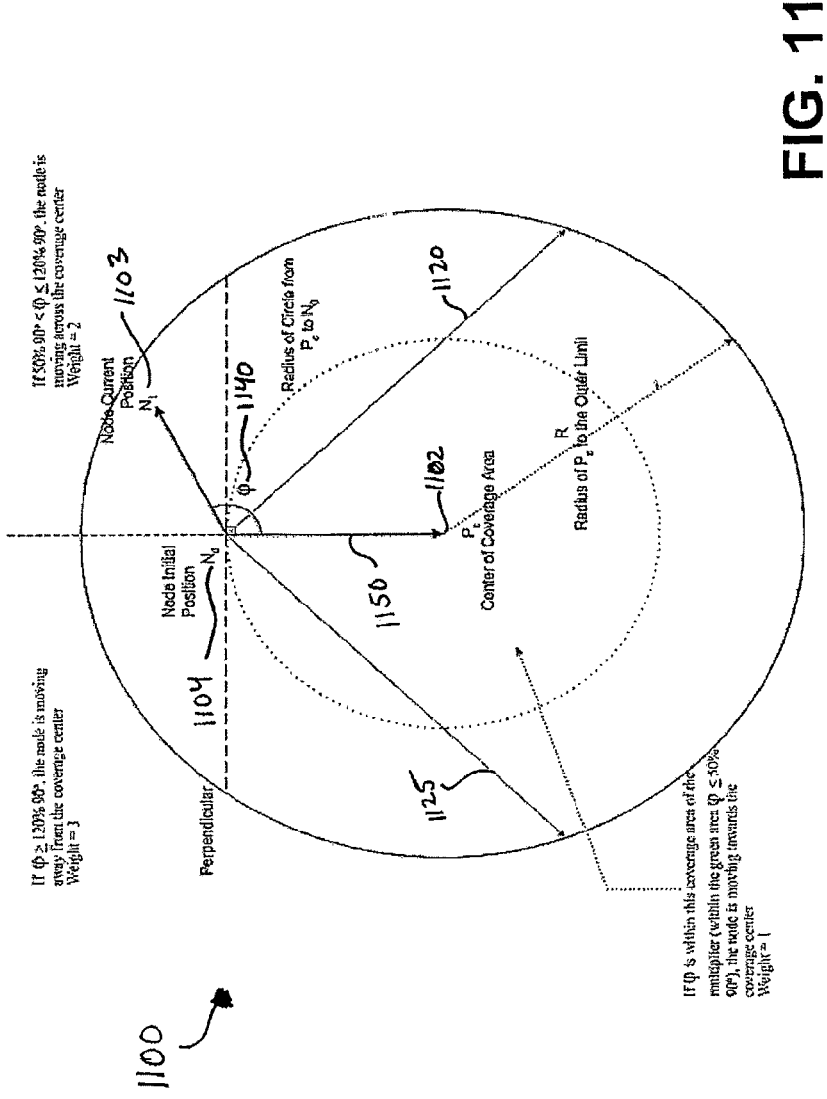
FIG. 11 shows mobility predictions and asset weighting that may be used in accordance with the present invention.

FIG. 11 depicts the geometry 1100 used in order to evaluate a relative value of each relay based on a node's position and the direction that the node is moving. The Algorithm may use the nodes position (1104), motion vector (1103) and the center of the coverage circle (1102). It may determine the angle of the motion vector relative to the center line of the coverage circle (1150). By the relative angle to this line (1140), the system may be configured to determine if a node is moving toward the center (good for coverage), away from the center (poor for coverage) or across the coverage (medium). 1125 and 1120 are reference lines meant to show the relationship of the angles.

Figure 12:
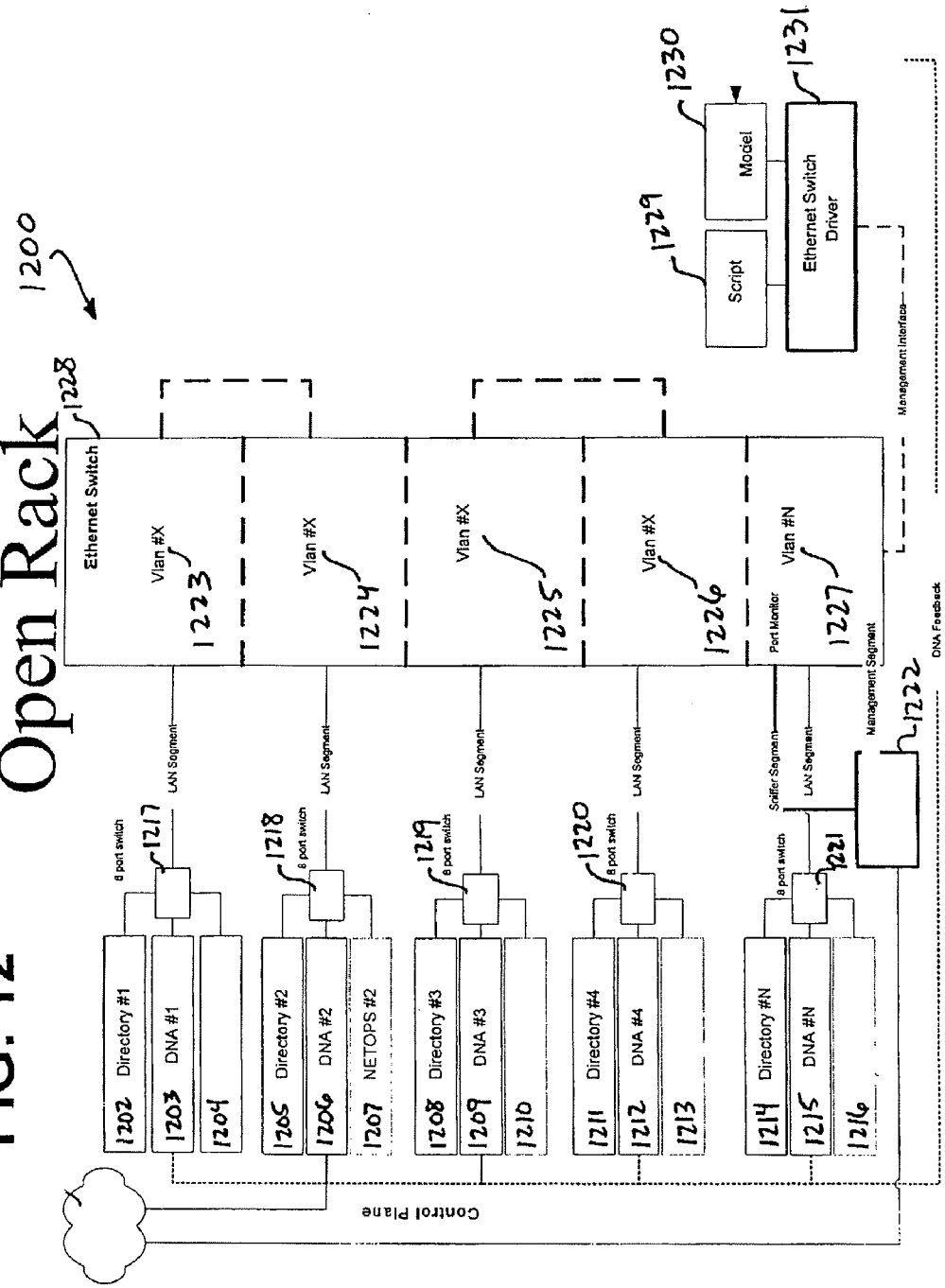
FIG. 12 illustrates an open rack configuration according to one embodiment of the present invention.

FIG. 12 shows an exemplary configuration of a DNA 1200. Computers 1202, 1203, 1204, 1205, 1206, 1207, 1208, 1209, 1210, 1211, 1212, 1213, 1214, 1215, 1216 may be may included in the DNA, directory and Network Administrator System software. Each group of three computers (e.g.,1202, 1203, 1204) may become a virtual node or CE. Switches 1217, 1218, 1219, 1220 can be configured to support connection of these computers to the switch 1228. The switch may be used to make virtual connection via VLANs 1223, 1224, 1225, 1226, 1227. These VLANs 1223-1227 may emulate radio connections. This may allow DNA algorithms to be tested in a lab without the use of radios. FIG. 12 also shows the interface to the model 1230 and simulation capability via 1231. As shown in FIG. 12, scripts 1229 and simulation software may also be accessed by the DNA, as well as software 1222 that helps capture traffic and performance.

According to one embodiment of the present invention, the planner's intent may be abstracted in order to produce data to be input into the distributed networking agent. By abstracting the planner's intent the distributed networking agent may be configured to automatically respond to network events, such as, for example, the addition or removal of a node or equipment failure. Moreover, the distributed networking agent may be configured to maintain reachback capabilities with alternate equipment. According to an exemplary implementation of the present invention, a planner might desire to guarantee a reachback to a different network that includes, for example, integrated voice, video, and data communications. This network may be, for example, a telecommunications network deployed by a telecommunications common carrier, a military network (e.g., CONUS) or some private network such as a LAN or an enterprise network. The hardware for implementing a distributed networking agent within a node of the communication network is not necessarily critical.

According to one exemplary embodiment of the invention, the distributed networking agent may be configured to manage long-term congestion and attempt to ensure that there is no long-term congestion when the system is given adequate resources. These resources include, for example, communications paths or links. These links may be either wireless communication paths, cable-based communication links (e.g., coaxial cables, fiber-optics or copper wires or any combinations thereof), and may also include, for example, satellite communications. Additionally or in the alternative, the distributed networking agent may be configured to connect a network having a number of different nodes from start up to complete connectivity in a predetermined amount of time. According to one embodiment of the present invention, the distributed networking agent may be configured to connect approximately 50 nodes from startup to complete connectivity in less than about one hour. Various other connectivity times such as two hours or forty-five minutes, for example, may also be implemented based on system desiger-requirements. For example, when a network does not need to be connected quickly, the system may be configured to establish connectivity in less time. Alternatively, where speed of connectivity is important, the network may be connected even more quickly. As will be appreciated by those skilled in the art, however, the speed of connectivity will be a function of the number of nodes that need to be connected, among other things.

Additionally or in the alternative, the distributed networking agent may be configured to determine and optimize the "m" links in a network including "n" nodes, where "m" is a subset of "n." For example, according to one exemplary implementation of a distributed networking agent, the top 10 links in a 100 node network may be connected in a predetermined time period. The predetermined time period may be established based on the user's specifications. For example, in an embodiment where the rate of connectivity is critical, these 10 links may be connected in about thirty (30) minutes, for example. As will be appreciated by one of skill in the art, this time period may be decreased to 20 minutes or less and may be increased to forty-five minutes, one hour or more depending on the design considerations as described above. In one embodiment of the invention, the distributed networking agent may be able to connect and maintain a network having a predetermined number of nodes. The number of nodes may be about 200 nodes or more. The number of nodes could be any number of nodes "m" so long as there are at least two nodes in the network. According to yet another embodiment, the distributed networking agent may be configured to connect and maintain a network having between about 200 and about 500 nodes. Additionally, in some implementations of the present invention, the distributed networking agent may be able to form a network using the following input data: (1) authentication keys; (2) any specialized network keys; (3) a control plane broadcast channel; (4) LOS frequency list; (5) Satellite communication accessibility, channels and ephemeris; and (6) accessibility data associated with mobile units. In various embodiments, more or less information may be included prior to startup. The authentication keys may be uniquely associated with each node, for example. According to an exemplary embodiment of the present invention the specialized keys may include, for example a public key and private key system. Alternatively, the specialized network keys may include communications security (COMSEC) keys and/or transmission security (TRANSEC) keys in a military network for example.

In one exemplary embodiment of the invention, the distributed networking agent 170 may be configured to support: (1) loss of signal ("LOS") (directional antennas) with both nodes stability; (2) LOS (Omni-directional antennas—with either stationary or mobile nodes); (3) UAV to stationary or mobile node; (4) Terrestrial Relay directional with stationary node; and (5) terrestrial relay Omni with stationary or mobile nodes. Depending on the particular application desired, this system may be configured to support one or more of the aforementioned communications. According to other exemplary embodiments of the present invention, the networking agent 170 may be configured to employ any of a number of protocols and/or data encryption formats.

The distributed networking agent 170 may be configured to use the resources available to meet information flow requirements. The distributed networking agent may include a number of different modules. These modules may include, for example, processor-readable software code designed to implement certain algorithms and processes using input data and certain hardware to produce output data that can be used in managing a communications network. The distributed networking agent may include, for example, a link decision module 171. This link decision agent may be configured to decide which network assets will be used and which links to establish based on certain input data. These decisions may be based on predetermined criteria regarding connectivity requirements and QoS requirements that may be established prior to start-up. The link decision module 171 may be configured to perform a connection process and may be configured to coordinate link topology optimizations in response to utilization needs. This link decision module may be configured to utilize various input data, including, for example preplanned network topologies such as predetermined network administrator data, path profiling data, and data received from a directory 160. The link decision module may also be configured to obtain link status from the various network components and nodes. These network components and nodes may include various radio devices, routers, and mobile communications systems. When the link decision module 171 determines or receives instructions regarding the addition of a link, the module may be configured to go through a process to determine a best link type based on certain criteria associated with the current network. The type of links may be different based on whether the node is a mobile node or a static node.

The selection of the link type may be performed by a Link Type Selection module. The link type selection module may be configured to make a determination of which link to use based at least in part on an asset cost table used by the individual algorithms. This asset cost table may be configured to be referenced by any number of the various modules and/or algorithms according to various embodiments of the invention. The asset cost table may be configured to order potential link types from those that are least costly to those that are most costly. The following table illustrates an exemplary asset cost table according to one example of a distributed networking agent:

TABLE 1

ASSET COST TABLE

| State of a Particular Instance of distributed networking agent | | Potential Link Type |
|---|---|---|
| Static | | LOS |
| Static | Mobile | UAV |
| Static | Mobile | SAT |
| Static | | LOS - Allowing for Preempt |
| Static | Mobile | UAV - Allowing for Preempt |
| Static | Mobile | SAT - Allowing for Preempt |

The planner may be configured to anticipate the movement of various mobile communications devices or radios. For example, the planner may be configured to anticipate the movement of vehicles, changes in traffic patterns and unexpected network events. The distributed networking agent may include integrated modeling algorithms and simulation capabilities to be able to anticipate these movements.

The distributed networking agent may be configured as a goal oriented system in that it may be capable of deriving tasks from goals and situations. Additionally, the distributed networking agent may be configured to be collaborative in that it may be configured to work with other distributed networking agents in a coordinated fashion. By being configured to interface with additional distributed networking agents within the network, the distributed networking agent may therefore be configured to be distributed throughout the network. The distributed networking agent may be flexible in that it may be resilient to change and failure during interactions with various input sources or other network hardware. The distributed networking agent may be active and even proactive in that it may be capable of initiating actions based on observation, events, or external stimulus.

The Distributed Networking Agent Architecture

The distributed networking agent may be developed on a cognitive agent architecture (CAA). CAA platforms may perform human thinking and interaction, and may engage in such processes that allow them to have virtual perception, temporal reasoning and decision making, delegation, decomposition, and negotiation abilities. The CAA may include business rules that may be encapsulated in plug-in components. Additionally, it may be configured to have domain knowledge that is shared through a local blackboard. The CAA may also include service logic providers (including message transport services), which may be replaceable and extensible. One example of a CAA is Cougaar, which is an open source agent architecture for large-scale, distributed multi-agent systems.

The distributed networking agent enhances the operability of CAA platforms. Some exemplary enhanced CAA capabilities that may result from the present invention may include enhanced security, which may include operation under directed adversary kinetic and hackers or other attempts to. Additionally, the enhanced CAA may include enhanced stability, which may permit the distributed networking agent to operate in chaotic environments. Additionally, the enhanced CAA may include features that enable scalability, which may include societies of other medium complexity agents.

The CAA framework may be configured to support abstraction of various planning tools as services. This may permit the easy integration of tools and the replacement with minimum impact. According to an exemplary embodiment of the invention, the algorithms may be developed as plugins. Developing the algorithms as plugins may permit easy integration and specialization. FIG. 2 shows an exemplary flow of information according to one exemplary embodiment of a distributed networking agent. FIG. 3 shows the distributed networking agent integrated into a CAA framework with the interfaces of the current implementation.

The distributed networking agent architecture illustrated in FIG. 3 may be well suited for the increased range, increased agility and survivability requirements. The distributed networking agent may inherit features such as autonomous behavior (i.e., each node is capable of independent action); goal oriented behavior (i.e., each distributed networking agent reacts to its current environment and the goals that are planned for it); collaborative behavior (e.g, the distributed networking agents in each node may be configured to negotiate with each other); and proactive behavior (e.g., the distributed networking agent may be capable of initiating actions based on observation, events, or external stimulus).

Control Plane

The distributed networking agent may be configured to employ an inband channel (i.e. part of an established link) to facilitate information exchange with other nodes within the network. However, the distributed networking agent approach is the incorporation of a low data rate, wide coverage control plane. This allows fragmented nodes to exchange geo-location, assets and priorities in order to bring in directional Line of Sight (LOS) and Beyond Line of Sight (BLOS) links. Directional antennas and BLOS resources are critical for robust wide area networks. The control plane may permit the distributed networking agent to efficiently negotiate the use of these assets and quickly initiate radio links when inband channels are not available.

According to one exemplary embodiment of the present invention, a predetermined number of control planes may be used. The number of available control planes may be, for example, three control planes, although any acceptable number of control planes may be used. In an exemplary embodiment of the invention, the control planes may include, for example, UHF DAMA SATCOM, HF Near Vertical Incidence Skywave (NVIS) and a dedicated channel of Ka SATCOM, which are highly specialized networks. Various other commercial network control planes may also be used in connection with the present invention. The distributed networking agent may be configured to determine which of the various control planes may be used in connection with a particular scenario.

The control planes may be designed to support a predetermined data stream, such as, for example, 100 bps, 500 bps, or any other acceptable bit rate. According to one embodiment of the invention, the control plane may be configured to support a minimum of 600 Bps. In an alternative embodiment, where data transmission at a rapid rate is more of a priority, the control plane may be configured to transmit data at a rate of 1 Kbps or more. As described above, any data transmission rate may be appropriate depending on the type of data being transmitted as well as whether it is important to transmit the data rapidly or not. In one implementation of a control plane according to an aspect of the present invention, the control plane may be configured to have both a broadcast mode and a multicast mode. In yet another embodiment, the control plane may only have one of a broadcast mode and a multicast mode. According to another aspect of an embodiment of the present invention, the control plane may be configured to support point-to-point communications. According to yet another embodiment of the present invention, the control plane may have a coverage of tens or even hundreds of kilometers.

Radio Management

The distributed networking agent may be configured to manage various network assets. These network assets may be mobile or static. More specifically, the distributed networking agent may be configured to manage radios. It determines which radio and relay asset are to be used, where antennae need to be pointed and the frequencies and power levels to be used in order to ensure that the radio is properly connected to the network. In order to perform these functions distributed networking agent may be configured to rely upon multiple integrated tools and intelligent algorithms running within the agents themselves.

As shown in FIG. 3, the distributed networking agent may include a radio management module 401. This radio management module 401 may be configured to "understand" radio channel characteristics, including expected Bit Error Rate (BER) and latency. This radio management module 401 may be configured to interact with an underlying architecture management agent via a radio control plugin 402. Using the radio management module 401, the distributed networking agent may be configured to "understand" how mobility and terrain impact radio options and performance. These characteristics and their impact to the network may be used in the distributed networking agent to make decisions.

The distributed networking agent may also include a path profiling function. This path profiling function may be implemented using a path profiler module 403 that may be configured to interface with the underlying architecture agent or agents using a path profiler plugin 404. Using the path profiler module, the distributed networking agent may be configured to determine if line of sight is possible with data associated with the environment in which the network is operating. This data may include, for example, digital terrain elevation data ("DTED"). Using the path profiler module 403, the distributed networking agent may be configured to determine propagation loss over the transmission distance. This determination may take into account the statistical weather and foliage data. Using radio characteristics, the path profiling module 403 may be configured to determine fade margin and rank potential radio channels.

The distributed networking agent may also be configured to predict coverage of mobile devices, such as, for example, UAVs, along with determining visibility and path loss to mobile devices. The distributed networking agent may be configured to incorporate mobility into the weighting of potential UAV links. The distributed networking agent may be configured to determine the "goodness" or quality of the link given its current direction and any known waypoints. The distributed networking agent may also be configured to interpret satellite coverage footprints. This process may be accomplished using a coverage analysis module 405, which may interface with the underlying architecture agent using a coverage analysis plugin 406. The distributed networking agent may be configured to use the footprint data received from the coverage analysis module 405 to weigh different potential links. The distributed networking agent may be configured to use mobility in its decision. The distributed networking agent may be capable of eliminating the advantaged node problem common with UAVs and networking waveforms, by treating UAV channels as a shared resource allocated by the Relay Administrator. FIG. 4 shows a screen shot 500 of an example of the coverage analysis performed by the distributed networking agent.

As shown in FIG. 1B, a distributed networking agent may include directories 160 that may be used in, for example, radio management. Directory services (e.g., Mobility Services ID) may be responsible for the replication of data placed within a directory 160. The distributed networking agent may be configured to use a knowledge base 176 to maintain information needed by the local distributed networking agents. In one embodiment of the invention, the distributed networking agent may be configured to modify an object in the directory 160, as may be required, to reflect non-directory based updates to the distributed networking agent knowledge base 176. Conversely, the distributed networking agent may be configured to be notified of updates to directory objects (stored within the directory 160) and can modify the distributed networking agent 170 knowledge base 176 to reflect a directory update. According to one embodiment of the invention, all modules may be configured to communicate with one another via the knowledge base 176 to reflect a directory update. The directory function may be configured to ensure that the link information is replicated globally thought the network. Additionally, the directory function may be configured to ensure that the resource use information is replicated globally. In this manner, the distributed networking agents located throughout the network may be informed of various changes to networking conditions and resources as conditions change in the networking. Additionally, the directory function may be configured to allow for the downloading of information associated with the management of the network, such as, for example, control policies. Additionally, the directory function may be configured to permit the downloading of predetermined information, including information related to network assets, DTED data, ephemeris and UAV path data, for example.

Integrated Planning Tools

The distributed networking agent may include a path profiling function. As described above, the distributed networking agent 170 may be configured to implement path profiling functions using a path profiling module 172 (FIG. 1B). As shown in FIG. 3, the path profiling function may be employed using a path profiling module 403 which can interface with the other agents within the system using a path profiling plugin 404. This function may be able to determine if line of sight is possible with DTED data. It may also be configured to determine propagation loss over the transmission distance and take into account the statistical weather and foliage data. Using radio characteristics, the path profiling function may be configured to determine fade margin and rank potential radio channels.

The path profiling module 172 may be implemented as processor-readable software code and/or network hardware. The path profiling function according to various aspects of the present invention may include the determination of characteristics enabling the distributed networking agent to estimate the performance of point-to-point line of sight (LOS) links in, for example, the Ku-Band and may also be configured to provide a metric for the "goodness" or quality of a link. Additionally, the link profiling function may be configured to determine if two nodes can communicate via satellite and may also be configured to provide a metric associated with the goodness of that link. According to another aspect of the present invention, path profiling may be configured to determine if two nodes are capable of communicating via UAV and may be configured to provide a metric for the goodness of the link. Additionally the path profiling software may be configured to incorporate Foliage information. The path profiler 172 may be configured to incorporate mobility vectors and predict how long its path prediction will be valid. In another embodiment of the invention, the path profiler 172 may be configured to predict various forms of connectivity.

The distributed networking agent may also be configured to predict coverage of UAVs, along with determining visibility and path loss to a UAV. The distributed networking agent may also incorporate mobility into the weighting of potential UAV links. The distributed networking agent may be configured to determine the "goodness" of the link given a current direction associated with the mobile device and any known waypoints. The distributed networking agent may also be configured to interpret satellite coverage footprints as described above. The distributed networking agent may be configured to use data associated with the footprint to weight different potential links. Again, the distributed networking agent may be configured to use mobility in its decision. The distributed networking agent approach may eliminate the advantaged node problem common with UAVs and networking waveforms, by treating UAV channels as a shared resource allocated by the Relay Administrator.

Integrated Cosite Tool

With the advent of software programmable radios, a cosite interference problem may be magnified. In some areas, more flexibility causes complications and cosite interference is one of them. In other words, the collocation of multiple pieces of communication equipment at a single location may be detrimental to network performance. The interaction of the many diverse radios in a single platform may, however, be modeled, understood and used as part of the channel assignment process.

The distributed networking agent may be configured to include a cosite analysis tool 178 that may generate interference profiles for each radio. This interference profile may be dependent upon a current set of transmitting radio equipment. These profiles may be developed with a combination of test and analysis data. When the distributed networking agent is assigning frequencies, it may use an appropriate stored profile in the evaluation and weighting of potential channels. The distributed networking agent may be configured to analyze potential channels for cosite problems. Each potential channel will be rated for predicted interference. The near end and far end nodes may be configured to negotiate the best compromise of channels.

In scenarios that are channel limited, the ability to aggressively reuse frequencies will be critical. The EMI "sniffer" may sample the environment seen by the directional antennas, when they are pointed. This may maximize the ability to reuse frequencies in a real time changing environment.

The second component to interference may include intra-site or radiation from emitters external to the platform. Frequency reuse algorithms may be configured to exploit spatial separation from directional antennas. In ad hoc networks, this may be difficult.

The distributed networking agent may include an EMI "SNIFFER" for this problem. The distributed networking agent may be configured to point an antenna in the correct direction and sample the potential channels for interference. This may allow the distributed networking agent to weigh the channels in the real time assignment process and reuse frequencies as aggressively as the radio physics will allow.

Relay Administrator

The distributed networking agents may be configured to operate locally to meet an individual node's goals. In order to meet these goals the distributed networking agents may be configured to share common assets. These include terrestrial relays, UAVs and satellites, for example. Each of these assets may include fixed resources that may be used by a discrete number of nodes. The distributed networking agents may be configured to negotiate the use of these resources and the Relay Administrator may be configured to perform this function.

Any distributed networking agent may be configured to initiate the relay administrator function. The relay administrator's information may be automatically backed up throughout the network and in the event that the primary relay administrator goes offline a backup can seamlessly assume its responsibilities.

The relay administrator may be configured to evaluate and weigh multiple relays for each requested link. It may be configured to balance the requirements of a node with its priority in the network. Each relay may be passed through a number of go-no go criteria. These criteria test to determine if the relay will accomplish the required task, for example are the nodes covered by the relay, and does the relay have the required bandwidth? If the relay passes this portion, testing a second set of criteria generates a metric to be used in comparison to other relays to determine the best relay to accomplish the task. The second set of criteria includes: (1) the size of the coverage area; (2) mobility of the selected nodes; (3) bandwidth and latency of the relay. The relative weights of some or all of these tests may be set by policy.

Link Decisions

Various aspects of the distributed networking agent link decisions will be described in the following sections. In some embodiments of the invention, a link decision function may be configured to choose between several data paths for initial connection via Community of Interest (COI) and physical link goodness. As shown in FIG. 3, a COI plugin 421 may be configured to assist in the link decision functionalities associated with the distributed networking agent according to the present invention. Additionally the link decision function may be configured to increase or decrease a physical link data rate by filtering data from the Link status in order to minimize congestion and/or total bandwidth. Additionally, the link decision may be configured to suggest switching connectivity between one pair of nodes to another based on a filtering from the link status (i.e., a change in topology). According to yet another aspect of the invention, the link decision algorithm may be contained in a filtering function in order to allow easy change for incorporation into the modeling and simulation processes.

Initial Connectivity

Initial connectivity may be invoked by system state. When a node fails to maintain a critical amount of initial links as defined by, for example, a predetermined policy, the initial connectivity algorithm may be invoked. This can happen at any time during a deployment. Initial connectivity establishes the dynamic formation of links. Initial connectivity may be invoked after planned links are attempted. The numbers of links that are set up by initial connectivity may be configurable via a policy setting. Initial links include both wireless and wired links, provided that wired links are detectable by the distributed networking agent. The initial connectivity may be configured to rely on the network administrator system for planning information, like Community of Interest (COI) and asset cost. This information may be relayed to the underlying agents via the COI plug-in 421. The initial connectivity algorithm may be configured to score the COI, Range, and mobility of a distributed networking agent instance for a potential asset from lowest cost to highest cost. The network administrator system may be configured to provide asset cost to the distributed networking agent via policy. Nodes that are not in the COI database may also be considered for connectivity based upon an algorithm that considers range, among other things. According to one embodiment of the invention, the algorithm may also be configured to take into account Needlines.

The distributed networking agent may be configured to attempt to form a network in a distributed fashion using frequencies, shared assets, relays, and other preplanned information that is provided by the network administrator system. Initial asset discovery is accomplished using a low bandwidth control plane. Preplanned links defined by the network administrator system may be attempted first. Next links may be automatically formed using CIO and Distance as weighting functions.

Each node may have an Initial Connectivity goal of 0, 1, 2 or more links. On power up, the node may be configured to determine if it is connected to the network via cable or other asset and check its initial connectivity goal. If the goal is not met, the node will attempt to add a link. The initializing node broadcasts a node summary packet identifying itself to the network. This broadcast information includes the nodes identity, its geo-location, its mobility state, and its asset configuration. All receiving nodes evaluate whether to respond to the node with their own node summary packet. The initializing node evaluates the responses and selects the best candidate to connect to. The selection is based on weighted criteria that include a preplanned Community of Interest (COI), the distance between nodes, and the mobility state of each node. Once a selection is made the initializing node will attempt to negotiate the link with the selected node. If the negotiation fails, the algorithm continues by selecting the next best candidate for connectivity until the initial connectivity goal is reached. A node will continually test to guarantee that it is meeting its initial connectivity goal on a periodic timer.

The initial connectivity algorithms may be configured such that a fragmented node broadcasts a node ID. Additionally, a fragmented node may also broadcast location priority as well as assets. This broadcast may be made by way of the control plane. According to one aspect of the present invention, the receiving nodes may be configured to evaluate the desire to connect via a COI, asset costs and whether it is possible and respond via the control plane. Additionally, an initiating node may be configured to evaluate any responses received via COI. Nodes may be configured to attempt lowest cost links and mode up in cost, first with no-preempt, then allowing priority based on preempt. In one embodiment of the invention, the initial connectivity goals may be 0, 1, 2, or 3 connections.

A Community of Interest (COI) is a list of predicted traffic. This may be listed as source to destination traffic. Additionally, the COI values may be generated by the defined community requirements form the network planner. In the case of IERs, the COI may be the list of the top six traffic sources to a Node, with the value corresponding to the percent of traffic from the particular source. The total bandwidth of the six may be appended to the list. The COI may be based on the total predicted traffic. Additionally, the COI concept may be added to units, enclaves, and convoys.

Heal

A "fragmented network(s)" is a network that is not fully connected. During the initial network formation fragmented networks may occur since the goals of Initial Connectivity do not address a fragmented topology. The distributed networking agent may be configured to listen on the control plane for asset discovery messages from nodes and will discover nodes that are not part of its current topology. The Healing algorithm is active when the goals of initial connectivity are met and the node is aware of other nodes not in its topology. The Healing algorithm will attempt to create a "fully connected network" by connecting 2 or more fragmented networks.

The Defragment Algorithm runs on a period basis. The Defragment algorithm analyzes the topology and determines if all known nodes are part of the topology. If nodes are found not to be a part of a node's topology then the overall topology is considered to be fragmented. The known active nodes then must determine which node in its connected topology is responsible for healing the fragments. For each node in its connected topology it determines a score for a link to each node not in its fragment.

The heal score may be the sum of $\alpha$*Distance+$\beta$*COI+$\delta$*Mobility value, where $\alpha$, $\beta$ and $\delta$ are set by policy. Where distance may be: For distances of 0 to 40 km=100−(2.5*# km) and for distances greater than 40 km=0. The variable COI may be defined in the the network administrator system's plan. The mobility values are indicated in Table 3, below.

TABLE 3

Mobility Values

| Planned | Actual | Value |
|---|---|---|
| Static | Static | 100 |
| Static | Mobile | 50 |
| Mobile | Static | 50 |
| Mobile | Mobile | 25 |

The node responsible for healing is the node which scored the highest amongst its connected topology. The responsible node will attempt a connection. If this connection attempt fails then this responsible node will publish a temporary Failed Connection Attempt object to the Directory. Nodes that have active Failed Connection Attempts can not be responsible for healing fragments. The algorithm will then reevaluate and select another node to attempt to heal the network.

A node will compare nodes that it can reach inband (via the network) against nodes that it has heard out of band (over the control plane). When a node recognizes a mismatch, it will know that the network is fragmented. Each node will evaluate if it should attempt to solve the problem (connect to the node) based on a weighted criteria that includes COI, asset cost and available assets. The best fit node in the network will attach to the fragment.

resources. The planned link concept also allows for reachback connection, where the nodes cannot negotiate via the control plane.

The Planned Link concept may allow experienced network administrator system operators to explicitly define requirements for traffic flow. In case where the operator does not want the randomness inherent in distributed networking agent decisions, the operator can force links. The operator is given two types of preplanned links for this, specific and general.

The Planned Link concept will allow the network administrator system operator to schedule specific events. An example is a Video Teleconference. With planned links, the network administrator system operators can send their knowledge of planned changes in traffic flow to allow the distributed networking agent to anticipate the demand. For the initial spiral, we will assume these events to be at least 300 Kbps and at least ½ hour duration. Either specific or general planned links would be appropriate for this use.

The Planned Link concept may be useful when one Node is outside of the Control Plane. In cases of reach back, where a Node can be in a satellite spotbeam. The a priori information required for the initialization of a link may be contained in a Planned Link table. A link employed based on the planned link table is a "Non-negotiated Planned Link." This is a special case with special handling within the network. Both ends may be required to initialize the link.

The concept of Planned Link may be used sparingly. The intent is not to replace the distributed networking agent. It is expected that a maximum of approximately 1 or 2 percent of links may be planned.

The basic flow of planned links may be as follows: (1) the network administrator system plans Links and distributes via directory; (2) the initiating Node's distributed networking agent reads the relevant planned link and "plans" it; (3) the relay Administrator may evaluate all Planned links using relay assets and reject lower priority links in the case of conflict; (4) the Initiating Nodes reports that the Link was incorporated into planning successfully or not via directory; and (5) at the time when the link is effective the initiating Node brings in the link.

Planned Links may be determined by the network administrator system and distributed to the distributed networking agent via Directory, direct access or physical medium. According to one embodiment of the present invention, there may be three types of planned links, general, specific and non-negotiated. The information required by each plan link type is shown in Table 2.

TABLE 2

Types of Planned Links

| Type | ID | Init Node | Dest Node | Band width | Time Start | Time End | Radio type | Asset type | Delay | Freq 1 | Freq 2 | Prior | Relay Location |
|---|---|---|---|---|---|---|---|---|---|---|---|---|---|
| General | X | X | X | X | X | X | | | X | | | X | |
| Specific | X | X | X | X | X | X | X | X | | | | X | |
| Non-Neg | X | X | X | X | X | X | X | X | | X | X | X | X |

Planned Links

The Network Planner may plan as much of the network as desired. The distributed networking agent may be configured to accept and implement predetermined or planned links that are received from the planner. These links can be specific or generic. They can specify the resources, radios and frequencies used, or they can specify a connection between two nodes and the distributed networking agent will decide which In Table 2, ID represents the planned link ID, which may be a unique identifier for that planned link. The Initiating node may be the Role defined for the Node to start the link negotiating process for a general or specific planned Link. In the case of a Non-negotiated Planned link, there is no negotiation process and both initiating and destination nodes bring in the link independently. Destination node is the role defined for the node to complete the link. The minimum desired bandwidth is the radio data rates in Kbps (e.g., 2000, 10,700, 200). Time start is the time and date to start the link in military time in GMT (e.g. Feb. 4, 2004 14:22). Time end is the termination time in military time in GMT (e.g. Feb. 4, 2004 14:22). Radio type is which radio to use. For example the type of radio may be LOS, UAV, KA SATCOM. Other types of radios may be used in connection with the present invention. Asset Used is the identifier for the Satellite, UAV or terrestrial relay to be used. Maximum Delay desired will be the specified Delay in milliseconds. Stab will be a metric for stability. Freq1, Freq 2 are the pair channels for communication. Priority will be from 0 to 100, where 100 is the highest. Relay location is Latitude, longitude and height of Relay asset.

An asset controller, for example, may be configured to provide initialization and maintenance that may be needed by any function. In one embodiment of the invention, the asset controller may be configured to ensure that the used resources (i.e., radio channel, satellite channel or other communications channels) are marked used. Additionally, the asset controller may be configured to insure that the appropriate resources are marked free when the link ends.

Planned Links may have the highest Priority in the Link decision process. At startup, a node may be configured to execute the highest priority planned link first, then lower priority, then if necessary standard algorithms. A planned link may be able to preempt any other type of link that has a lower priority. If two planned links conflict on resources, the highest priority planned link may be executed. It may be the responsibility of the network administrator system to guarantee that two planned links do not have the same priority.

If a planned link fails, the node may be configured to re-attempt the planned link after waiting for a predetermined amount of time. This predetermined amount of time may be established by the network administrator system. This predetermined amount of time may be, for example, 5 minutes or any other predetermined amount of time. This waiting period may be repeated every following 5 minutes (TBSBP) (or otherwise periodically) until the link is made or the effectivity is over. If a distributed networking agent instance cannot create a Planned Link using available assets the distributed networking agent may preempt other links to make shared assets available. Assets that are planned with a current effectivity may be used last, but may be used. When the initiating Node requests the planned assets, the current link using the assets may be preempted. The Relay Administrator may send a preempt notice to both nodes before assigning a new link. The nodes that receive the preempt message may be configured to terminate the link.

The network administrator system can "cancel" a planned link by removing it from the Directory. When a planned Link is cancelled by the network administrator system, the initiating distributed networking agent node may be responsible for acting on the link. If the Planned Link is active, the distributed networking agent node may keep the link in, but remove its priority. If the Planned Link is not active, the distributed networking agent may not create the Planned Link.

Topology Optimization

The initial network formation may not provide enough bandwidth or robustness to meet the real-time demands. The distributed networking agent monitors the link status for utilization trends and determines if it is appropriate to add a link or increase the bandwidth on a link to attempt to meet the users demands. Because the Encryption devices aggregate the IP address from the distributed network agent's As link status it aids in correlating the IP addresses to distributed networking agent assets.

Link Prioritization

Link Priority may include a combination of preplanned prioritization from the network administrator and the importance of a link to the network. The Link Priority score may be based upon a weighted score (TBSBP) and history. The score is made up of factors that include, for example, Separation Value, Link Utilization from Link Status, COI, NeedLine, and Role Priority and past Link Priority scores.

The Link Priority of a link may be defined as:

Link Priority=$\beta$*Old Link Priority+(1−$\beta$)New Link Priority

In this equation, $\beta$ is set by policy. The formula to compute a Link Priority may be defined as follows:

$\alpha$*Separation Value $\beta$*Link Utilization+$\delta$*COI+ $\gamma$*NeedLine+$\epsilon$*Role Priority, Here, $\alpha$, $\beta$, $\delta$, $\gamma$, $\epsilon$ may be set by policy. The Separation value may be calculated by: (1) determining links were if they were gone, the network would be fragmented. Value=100* (number of nodes in smaller fragment)/(number of nodes in larger fragment). COI may be set by the network administrator system's Planning function. Additionally, role priority may be set by the network administrator system's planning option. Needline may be set by link status. Link utilization may be set by Link Status.

In the case of putting a new Link, the Link Priority may be the same summation as a regular Link Priority except that Link Utilization Value, Needline value, and Old Link Priority may be set to Zero. The reason is to give existing Links an advantage over Potential links when determining to preempt a link.

When a node attempts to make a link but has no assets available Link Decision 171 may decide if a lower priority link can be removed and it's assets given to the desired new link. If the asset that is needed is a radio frequency not controlled by the nodes attempting to create a link, the Link Decision may send a message to the node currently using the asset asking the node to release the lower priority asset. If the asset needed is a relay asset, the relay administrator may decide to remove the lower priority link and assign the asset to the higher priority link.

Top Talkers

The "Top Talkers" algorithm may be configured to directly link "top talkers" and relieve the network from the burden imposed by the "top talkers" on the network. A "top talker" is defined as a source and destination INE that burdens the network with a traffic load that exceeds a threshold defined by policy.

The Top Talker algorithm may be configured to attempt to link the highest source and destination traffic flows directly in order to minimize the burden on the network. The Top Talker algorithm may run at each node after that node has met its initial connectivity goals. Each node may be configured to evaluate its topology for Top Talkers on a periodic basis, which is set by policy. The top talkers algorithm may constantly evaluate\ candidate top talkers based upon the time average network traffic loads that exceed a threshold. A network cost metric may be calculated by multiplying the traffic and path cost, using a shortest path first algorithm. Local Top Talker's network costs, which surpass a threshold may be published to all distributed networking agents. The highest cost problem elects itself to solve the problem. The local distributed networking agent may be configured to attempt to solve the problem by connecting to the destination node via a path the reduces the impact of the this high cost traffic through the network. If the local distributed networking agent cannot improve the link, it demotes itself from the Top Talker list and the second highest cost problem is elected to solve its Top Talker.

The top talkers algorithm may be configured to constantly evaluate candidate top talkers based upon the time average network traffic loads that exceed a threshold and the cost as a function of the number of network hops. The Top Talker's thresholds may be configurable via policy. Network Cost may be defined as the sum of traffic from node A to node B and the traffic from Node B to Node A divided by 2 and multiplied by the number of hops between Node A and Node B, calculated by the shortest path. Local Top Talkers Network Costs, which surpass the threshold, may be published to all distributed networking agents. The highest cost problem may elect itself. The local distributed networking agent may be configured to attempt to solve the problem by connecting to the destination node via the smallest possible number of hops. If the local distributed networking agent cannot improve the link, it may be configured to demote itself from the Top Talker list.

The algorithm's threshold, the threshold for a node to be considered a top talker, may be based upon the number of nodes are in the network. In the case of a large network the threshold level should be slightly more than in a case concerning a small network where the threshold should be lower. The threshold may include three levels where each level is based upon the number of nodes in the network. The levels may be set by policy. The levels are small, medium, and large. These values may be set by policy. The default may be, for example, that a small network consists of 10-15 nodes, where a medium network consists of 15-30 nodes, and a large network is 30 or more. These levels may, however, be defined by a system designer.

According to another embodiment of the present invention, rather using simply the number of hops for the cost calculation, the algorithms may be configured to use a generic path cost value, so that in the event that the planner wants to minimize satellite traffic, for instance, the cost of these links may be increased. This cost may be based on a number of variables, for instance asset used, latency and bit error rate, so that the planners can mange the aspects of the network which are critical to them.

Second, rather than optimizing for the single highest network problem, one at a time, the top N (where N is set by policy) problems may be evaluated simultaneously and the potential additional link may be scored for its ability to lower the combined impact of the N top traffic sources. Given the ability to add limited links to solve these problems, this approach will lead to a more balanced and stable solution.

Strong Backbone

Each distributed networking agent may be configured to evaluate the topology for single point of failures, either due to a link or a node. Each single point of failure may be quantified for impact to the network. The biggest impact failure may be solved first by adding a redundant link. FIG. 5 shows a screen capture 600 of the distributed networking agent engineering analysis tool used to evaluate the link decisions in a simulation.

The strong backbone algorithm may be implemented to address single point of failure issues ("weaknesses") in the topology. The Strong Backbone Algorithm may be run at each node after that node has met its initial connectivity goals. Each node may evaluate its topology for Strong Backbone weaknesses on a periodic basis, which may be set by policy. In particular, it looks at two types of topology weaknesses: 1. Core Separation Links and 2. Core Separation Nodes. A Core Separation link is a link that if broken fragments the topology such that the smallest fragment has at least n nodes, where n is set by policy. A figure illustrating separation links is illustrated as FIG. 9.

A Separation Node is a node that if it fails, fragments the topology such that the smallest fragment has least n nodes as set by the network administrator system's policy. One goal of the strong backbone algorithm may be to eliminate all core separation links and separation nodes by adding links to the topology.

A second goal of this algorithm in addressing these weaknesses may be to add links that would optimize the topology for traffic considering COI, Distance, and Role Factors. A cost score may be assigned to each weakness. The Cost Score may measure and assign the relative cost of each weakness in the topology considering the impact to the loss event (ie if the core separation link or separation node is lost) and the likelihood of this event.

The Cost Score of a Core Separation Link may be defined as:

(# of nodes in the smaller Fragment)/(# of nodes in the Larger Fragment)*100.

The Cost Score of a Core Separation Node may be the (# of nodes in the $2^{nd}$ largest Fragment)/(# of nodes in the Largest Fragment)*100. (Note in the case of the separation Node, there can be multiple fragments (more than 2).

These scores may be used to order the weakness so that the weaknesses can be worked in order from highest to lowest cost. Each node may determine who is responsible for addressing the worst-case weakness. Each node may evaluate all possible links that could be made that would alleviate the weakness. The local distributed networking agent may be configured to score each potential link. If a link has been tried and failed for this algorithm then a failed connection attempt may be posted in directory and cleaned up after a certain period. Any link that has a current failed connection attempt object in directory may not be a candidate to try on this period of the algorithm. One of the two nodes involved in the potential link may be the initiating node based on ordering determined by the CE team label.

Optimizing for BER (Link Level)

Due to the nature of radio links, the BER of any given link will fluctuate over time. The distributed networking agent may monitor the BER of all local and far end links periodically. This period may be, for example, once every minute. If the radio waveform requires AGC assistance, the distributed networking agent may adjust the output power of the radio in order to maintain a specified link BER. If the radio far end BER is below 10-7, the distributed networking agent may increase the transmit power by ⅒ (TBR) of a dB. If the radio far end BER is above 10-9, the distributed networking agent may decrease the transmit power by ⅒ dB (TBR).

If the near end or far end radio BER falls below 10-5 for two reports (static) or five reports (mobile), the distributed networking agent may mark the link as failing. The distributed networking agent may not consider a failing link as satisfying part or the entire Initial connectivity requirement and bring in another link if required. The distributed networking agent may prune a failing Link if the asset is required. This is described in the following paragraphs in more detail.

Extend or Prune

If the distributed networking agent detects a link that is under-utilized, it may be configured to determine if the link is a separation link and the amount of nodes depending on the link for connectivity. A separation link is a link that if removed will create 2 fragmented networks. Deleting links with a high separation value will cause fragmented networks that may potentially affect a high number of nodes. According to a preferred embodiment of the present invention, the link decision should not delete a separation link unless the assets are needed elsewhere. The links with the lowest separation value may be removed first, if the assets are needed elsewhere.

The distributed networking agent may be configured to operate in situations when a link needs to be broken and a new link created even when the distributed networking agent is resource limited. The distributed networking agent may be configured to ensure that the change will improve overall network performance and information flow. Link priority may be used to determine if a local link should be preempted in favor of a new connection requested link. Part of link priority may be based on the role of the node and the importance of the information it transmits and receives. A second factor may include how the node is being used in the network. A relatively unimportant node may be connecting several critical nodes and involved in critical needlines. A node can be important to maintaining a robust network due to advantaged geographic position. These concerns may need to be addressed in determining real time link priority.

Link Decision Factors

All the Decision Algorithms may use all or some of the factors in their decision to act on the network. The factors may be weighted. These weights may be set by policy. The factors in the decision algorithms may include the following exemplary factors:

Mobility

The distributed networking agent may be aware of a node's mobility and considers the effects of mobility as a factor of the link decision process and decides accordingly in order to make the best link choice. A distributed networking agent may detect transient link outages due to mobility and weighs this appropriately. FIG. 11 shows mobility predictions and asset weighting that may be used in accordance with the present invention.

2. Roles

The distributed networking agent may be aware of a node's role in the network. The distributed networking agent considers the effects the node role has on the topology and link decision process.

Distance

The distributed networking agent may be aware of a node's distance to any other node in the network. The distributed networking agent may be configured to consider distance to nodes as a factor in making Link decision where to use a particular asset type depends upon the distance.

Asset Cost

The distributed networking agent may be aware of a node's asset costs. The distributed networking agent considers the assets of a node in a particular weighing other assets as more desirable then others. This is especially important when determine which asset a distributed networking agent will used when deciding to make a Link.

COI

The distributed networking agent may be aware of a node's COI. The distributed networking agent may be configured to consider a Node's COI as part of the Link Decision as it is more beneficial to connect to nodes in one's COI.

Utilization

The distributed networking agent may be aware of a Link's utilization. This is especially important when considering replacing, removing, or extending the life of a link.

The distributed networking agent may periodically check the utilization of its connected links and compute a Resource Utilization score. The Resource Utilization score may be as follows:

Resource Utilization=$(\alpha)$*Separation value+$(\beta)$*Utilization from Link Status where $\alpha$ and $\beta$ are set by policy.

Due to the limited resources of the network, assets may be released from nodes in order to free assets to solve optimization problems. According to an exemplary embodiment of the present invention, planned links or needlines need not necessarily be evaluated. Links with a Resource Utilization score below a threshold (TBSBP) may be labeled, as under-utilized and appropriate action may be taken upon the link.

Links that have not expired or have been extended, with Resource Utilization above a threshold (TBSBP) may be labeled as over-utilized and appropriate action may be taken upon the link. Links that have expired or have been extend may be evaluated for usefulness. Policy may be able to turn off the link cleanup process.

When an under-utilized link is discovered, a timer may be started. When the timer (5 minutes, TBSBP) expires and the link is still under-utilized, actions and conditions may be considered, as will be explained in the following paragraphs.

Links providing lifeline functionality and separation links exceeding a threshold (TBSBP) may not be considered for deletion. Separation links are weighted based upon their separation value, are subject for deletion if found to be under-utilized. A separation link, as discussed above, is a link that may cause a network fragment if it is removed. Each distributed networking agent may evaluate the topology and mark separation links. A metric may be determined for each separation link, by counting the two portions of the fragmented network and dividing the smaller fragment by the larger fragment and multiplying by 100.

If there exist only 1 link for the instance of distributed networking agent, the distributed networking agent may be configured to attempt to lower the data rate of the link, for the case of variable bandwidth (possible LRIP capability). If the link data rate can be lowered, it may choose a lower data rate. If it cannot lower the data rate of the link, the distributed networking agent may attempt to put in a new link with a lower data rate. In the case of adding a new link to replace an under-utilized link, the new link may be in place before pruning the under-utilized link. If there exist 2 or more links for this node, the distributed networking agent may attempt to lower the data rate of the under-utilized link or replace the link with a new lower data rate link. If it cannot do either one of the two solutions, it may consider the Link for deletion.

Needlines

The intent of needlines is to guarantee that a node can fulfill it's primary functions. The needlines attempt to define the minimum required connectivity. The needlines may be actively tested, so they should be used sparingly. If the data needs can rely upon normal distributed networking agent processes to relieve congestion, they should not use needlines. The format of a needline is:

| Node A | Node B | QOS Level | Maximum Delay | Maximum Variation | Percent Required | Effectivity | Bandwidth |
|---|---|---|---|---|---|---|---|
| Team Label | Team Label | DSCP | Roundtrip in ms | Max-min in ms | 100%-0% | time | Kbps |

The basic flow is that each node will test its needlines at an interval of, for example, 5 minutes (TBSBP). The Node may send a modified "RSVP-Like" message to the routers. The routers may attempt to guarantee the bandwidth requested, through the appropriate routed path for that particular DSCP. This will require a Needline Request message from the distributed networking agent to the router and between the routers. This concept may be coordinated with WAN router development associated with a particular network. If any router cannot support the bandwidth request, a failure will be reported to all distributed networking agents via directory 160.

The failed needlines may be integrated into the optimization process. In the case of top-talkers, the optimization process maybe configured to handle all top talkers who have a network cost of greater or equal to TBD. After these big impact links are handled, high priority failed needlines may be fixed by minimizing the number of hops between the source and destination node. This may require an embodiment of the invention in which a WAN Router supports these Needline Requests. If the WAN Router cannot support this approach, the needlines will be tested with Pings and decisions will be made on round trip delay results.

Adding a Link

When the Link Decision agent decides that a link should be added, the Link Decision to Link Negotiator Add Link Message may be sourced. The following table illustrates this message.

TABLE

Link Add Message

| Field | Data Type | Value/Range | Description/Units |
|---|---|---|---|
| Message Type | String | Add Satellite<br>Add TCDL<br>Add UAV | Satellite<br>TCDL<br>UAV |
| Link # | String | Link 0-Link "n" | Identifies Link Number |
| TX Freq | Float | Length 0-TBD | Delimited Range of prioritized Frequencies |
| RX Freq | Float | Length 0-TBD | Delimited Range of prioritized Frequencies |
| Bandwidth | Float | 0-TBD | Desired BW in Kilo Hz |
| BER | Float | >1E-4<br>1E-5<br>1E-6<br>1E-7<br><1E-8 | Desired BER<br>Worst<br><br><br><br>Best |

This message may be passed from the Link Negotiator to Link Decision agent in order to inform the Link Decision if the link was added successfully. In the event of an unsuccessful attempt, the Link decision agent may attempt another link and associated frequency set. A table showing the contents of the add link response.

TABLE

Add Link Message

| Field | Data Type | Value/Range | Description/Units |
|---|---|---|---|
| Message Type | String | Add Satellite<br>Add TCDL<br>Add UAV | Satellite<br>TCDL<br>UAV |
| Success | Integer | 0<br>1 | Fail<br>Pass |
| Link # | String | Link 0-Link "n" | Identifies Link Number |
| TX Freq | Float | 0-TBD | Selected Frequency |
| RX Freq | Float | 0-TBD | Selected Frequency |

In order to delete a link the Link Decision passes the Link number to the Link Negotiator. This is illustrated in the following table.

| Field | Data Type | Value/Range | Description/Units |
|---|---|---|---|
| Message Type | String | Delete_Satellite<br>Delete_TCDL<br>Delete_UAV | Delete Satellite Link<br>Delete TCDL Link<br>Delete UAV Link |
| Link # | String | Link 0-Link "n". | Identifies Link Number |

In order to confirm a delete link has succeeded, the Link Negotiator passes the state of the delete link transaction to the Link Decision.

TABLE

| Field | Data Type | Value/Range | Description/Units |
|---|---|---|---|
| Message Type | String | Delete Satellite<br>Delete TCDL<br>Delete UAV | Delete Satellite Link<br>Delete TCDL Link<br>Delete UAV Link |
| Link # | String | Link 0-Link "n" | Identifies Link Number |
| Success | String | Link_Fail<br>Link_Pass | Fail Link Deletion<br>Pass Link Deletion |

A change link is used to change a links bandwidth or frequency allocations. Change links is accomplished by using the delete link and add link mechanisms.

The Link Status may periodically report to the Link Decision agent using the knowledge base. The Link Status will update the Link Decision table with time average status information. Bandwidth, TX and RX power, BER, per class utilization will be reported, and look angle. See the link status tech note for a detailed description of the interface.

A link status feature may be configured to monitor the physical router interfaces. (it may be preferable to have one router interface to each radio interface, rather than to virtual interfaces) and the near real time status of the transmission subsystem in order to determine QoS and SoS metrics to see if they are being met. In one embodiment of the invention, the link status feature may be configured to monitor the following: (1) link synchronization; (2) near end BER; (3) far end BER; (4) interference; (5) power level; and (6) data rate. From the router, the link status algorithm may be configured to monitor: (1) traffic quantity by source and destination address; and (2) traffic quantity per interface per QoS.

Using the directory agent the Local distributed networking agent may have access to a snapshot of all of the remote distributed networking agent Link Decision tables. The Local distributed networking agent may also be configured to write snapshots of the local Link Decision Table to the Directory agent for distribution of all other distributed networking agents in the system.

A Node added message may be sourced when the addition of a new node or link is successfully accomplished. This may be determined when the link to the node is in sync and inbound communication is detected by the link status. A table illustrating the link decision to directory message, below.

TABLE

| Field | Data Type | Value/Range | Description/Units |
|---|---|---|---|
| Message Type | String | Link_Added Node_Added | Link Added Node Added |
| Team Label | String | | Team Label |
| Link # | String | Link 0-Link "n" | Identifies Link Number |
| Latitude | Float | −90-90 | Degrees |
| Longitude | Float | −180-180 | Degrees |
| Altitude | Float | −1,000-30,000 | Meters ± Sea Level |
| Motion Vector | Float | 0-360 | Speed (km/hr) |
| Bandwidth | Float | 0-TBD | Bandwidth in Kilobits/second |

When Link status informs Link Decision that a Link is out of Sync for TBD seconds, an idle timer of TBD seconds may be triggered. When the timer expires, the Link Decision may then delete the Link or in the extreme case, node from the Directory agent. A table illustrating the agent node delete message appears below.

TABLE

| Field | Data Type | Value/Range | Description/Units |
|---|---|---|---|
| Message Type | Integer | Link_Deleted Node Deleted | Link deleted Node Deleted |
| Team Label | String | | Team Label |
| Link # | String | Link 0-Link "n" | Identifies Link Number |

A link decision to path profiler message appears in the table below.

TABLE

| Field | Data Type | Value/Range | Description/Units |
|---|---|---|---|
| Message Type | String | Satellite_Link LOS_Link UAV_Link | Satellite Link LOS Link UAV Link |
| Local Team Label | String | | Team Label |
| Link # | String | Link 0-Link "n" | Identifies Link Number |
| Local Latitude | Float | −90-90 | Degrees |
| Local Longitude | Float | −180-180 | Degrees |
| Local Altitude | Float | −1,000-30,000 | Meters ± Sea Level |
| Local Motion Vector | Float | 0-360 | Speed (km/hr) |

TABLE-continued

| Field | Data Type | Value/Range | Description/Units |
|---|---|---|---|
| Local TX Frequency | Float | 0-TBD | MHz |
| Local RX Frequency | Float | 0-TBD | MHz |
| Remote Team Label | String | | Team Label |
| Remote Link # | String | Link 0-Link "n" | Identifies Link Number |
| Remote Latitude | Float | −90-90 | Degrees |
| Remote Longitude | Float | −180-180 | Degrees |
| Remote Altitude | Float | −1,000-30,000 | Meters ± Sea Level |
| Remote Motion Vector | Float | 0-360 | Speed (km/hr) |
| Remote TX Frequency | Float | 0-TBD | MHz |
| Remote RX Frequency | Float | 0-TBD | MHz |
| Bandwidth | Float | 0-TBD | Bandwidth in Kilobits/second |

Fade Margin will replace Weighted Priority. In response to the Link Decision request to have a link profiled, the Link Profile may be configured to respond with a weighted pass or fail indication for the link in question. A Weighted Priority of 1 to TBD may indicate that a link is possible, where 1 is the lowest priority and TBD is the highest priority. The table below shows the link decision response message according to an exemplary embodiment of the invention.

TABLE

| Field | Data Type | Value/Range | Description/Units |
|---|---|---|---|
| Message Type | String | Satellite_Link LOS_Link UAV_Link | Satellite Link LOS Link UAV Link |
| Team Label | String | | Team Label |
| Link # | String | Link 0-Link "n" | Identifies Link Number |
| Weighted Priority | Integer | 0 1-TBD | Link not possible Weighted Link Priority |

The Asset discovery process may be configured to report to the link decision table when a new node is detected. This will trigger the Link Decision process to establish a link based initially upon COI. Once connected and a history is recorded, the link decision will rely on the traffic utilization history.

The following table defines the message use when a new node is detected by the Asset discovery.

| Variable | Data Type | Value/Range | Description |
| --- | --- | --- | --- |
| Message Type | String | Remote_Node_Detection | Remote Node Detected |
| Team label | String | | Identifies Team Label |
| Latitude | Float | −90-90 | Degrees |
| Longitude | Float | −180-180 | Degrees |
| Altitude | Float | −1,000-30,000 | Meters ± Sea Level |
| Motion Vector | Float | 0-200 | Speed (km/hr) |
| | | 0-360 | Direction |
| Suggested Links | TBD | | Availability of suggested radio assets (Word for each radio, see table Table $X_{2a}$) |
| Priority | Unsigned Integer | | Number for making decisions. |
| Authentication Key | TBD | | Verify Asset from a known good source (TBD) |
| Connected | String | Node_Connected | Node is Connected |
| | | Node_Disconnected | Node is not Connected |
| Time Stamp | Unsigned Integer | 00000001012000 to 23595912319999 | HHMMSSMMDDYYYY |

The following table defines the response from the Link Decision agent to the Asset Discovery agent.

| Variable | Data Type | Value/Range | Description |
| --- | --- | --- | --- |
| Message Type | String | Remote_Node_Detection | Remote Node Detected |
| Team label | String | | Identifies Team Label |
| State | String | Node_Connection_in_Progress | Connection Attempt In Progress |
| | | Node_Connected | Connected |

The Link Decision passes the following message to the Path Profiler in order to determine if the link is possible. The path profiler may be configured to pass back a pass-fail indication to the Link Decision agent through the knowledge base.

If a Link is discovered to be over-utilized, a timer may be set (e.g., 5 minutes TBSBP or any predetermined interval) and started. When the timer expires and the link is still over-utilized then the Link Decision may attempt to increase the data rate of the link. If the Link Decision cannot increase the data rate, the Link decision may attempt to add an additional link.

If the Link Decision cannot add an additional link it may send the WAN Router a message informing the WAN Router to rerouted some traffic away from the over-utilized link. If the Link Decision cannot add an additional link it may send the Tier 3 OFIMS a message of an over-utilized link.

The distributed networking agent may be configured to determine if a link is beneficial to the network. A beneficial link is a link that improves the network in some way be relieving congestion in other areas of the network, or providing a network connection used by other nodes. The more beneficial a link is the more beneficial it is to have it remain in the network past its expiration.

This may not interfere with Link Pruning, or when assets are needed, or when the link itself become under-utilized. When determining if a link is effective, the distributed networking agent may evaluate the Link priority of the link. If the priority is below a threshold (TBSBP) the link may be considered to be pruned. If it is above the threshold then the link may be considered beneficial and have its expiration time extended. The amount to extend the expiration time may be based upon the mobility of the node. If the node is mobile then the amount (TBSBP) should less than that of a node, which is static.

If the Link is connected to either a mobile UAV, or the node is mobile, then the Link may need to be assessed for usefulness and time-to-live. The time-to-live is based on how long the node has until it is outside the area of coverage from the UAV or Satellite. This may be calculated from the information obtained from the Link Status function. From that information the distributed networking agent may construct the time-to-live value based upon its look angle.

According to an exemplary implementation of the present invention, the threshold for a link is a 10-degree look angle to the UAV. If a nodes look-angle is approaching this threshold may then have a smaller time-to-live value then those links that have a look angle that is relatively large or is not approaching the threshold as fast. Links that have a small amount of time to live may be either replaced with new Links or will be pruned to free up resources. In the event that resources are unavailable, Links with little time to live may be considered to be pruned to free up resources.

In an exemplary embodiment of the invention, the asset discovery algorithm may wait a predetermined time period to allow connectivity via WNW or cable. In one embodiment, the predetermined time period may be two minutes. The asset discovery algorithm may also be configured to connect to the other nodes via inband (i.e., link negotiator). In addition to, or in the alternative, the assert discovery function may be configured to broadcast geo-location on the appropriate channel asset as decided by the predetermined policy. This may be, for example, a broadcast query. In yet another embodiment, the asset discovery function may use any one of the following NFNVIS, UHF DAMA, KA satellite or inband for control channels. The network administrator system may be configured to preload information. Such information may include, for example: (1) asset availability; (2) asset costs; (3) how often a node should broadcast its geo-location, while fragmented; (4) how often a node should broadcast its geo-location, while connected; and (5) community of interest—based on preplanned estimate of traffic between two nodes.

Receiving nodes may be configured to filter queries to determine how to respond to a particular query. The asset discovery function may also include Community of Interest, Link Quality, and Priority information. In some configurations, the asset discovery feature may enable the receiving nodes to predict the path profiles (e.g., with a path profiler) and generate Metrics of goodness combined with COI. Receiving nodes may be configured to reply with suggested links and metrics (i.e., they may make link decisions). Additionally, the originating node may be configured to chose from possible links and negotiate with a particular node. Responses received by the Originating node may be transferred over to, for example, a Knowledge Base. In one embodiment, the nodes may be responsible for periodically broadcasting a status message via the control plane on intervals. These intervals may be predetermined and defined in the policy.

The Traffic History Table, shown here as Table 4, will correlate Source and Destination IP addresses to source and destination team labels. The Normalized Utilization may be calculated based upon the local nodes available bandwidth. Since the Traffic history is collected at the WAN interfaces, the INEs have encrypted all of the traffic at this point. External networks may be masked by the source and destination INE addresses. This masking effect may actually aid in correlating traffic flows to ingress and egress nodes.

TABLE 4

Traffic History Table

| Router Interface | Source INE IP | Destination INE IP | Normalized % Utilization (calculated) | Bits/Second |
|---|---|---|---|---|
| E0 | a.b.c.d | w.x.y.z | | |
| E0 | a.b.c.d | w.x.y.z | | |
| E1 | a.b.c.d | w.x.y.z | | |
| E2 | a.b.c.d | w.x.y.z | | |
| E3 | a.b.c.d | w.x.y.z | | |
| E4 | a.b.c.d | w.x.y.z | | |
| E5 | a.b.c.d | w.x.y.z | | |
| EN | N | N | | |

A number of factors may be considered when calculating the link priority. For example, some such factors include: (1) Role-based priority value, which is a preplanned value based on the role of the node, i.e., its function in the battle; (2) separation link value (some links are single connections between potential network fragments, if they are removed, the network may become fragmented. These may be identified in real-time and the impact to the network may be qualified; (3) link utilization value (how well is the link utilized? The better the link is utilized, the less the distributed networking agent will want to disturb it; (4) link needline value (a value that indicates the importance of this link in meeting the Needline requirements over the entire network. This is a metric attempting to quantify how much critical data is being relayed through the node. The actual priority may be the sum of these values with a weighting factor set up by a policy. The desire may be to balance the importance of the node with the importance of the network.

Containers

One exemplary goal of the distributed networking agent according to an embodiment of the invention may be to guarantee that the planner's intent is met, even when the planner doesn't have direct control of the network. In order to ensure that the distributed networking agent performs as planned and the planner's intent can be accurately described, the distributed networking agent exploits Containers.

Containers are intuitive groupings of nodes with shared goals. Some examples are enclaves and convoys. A planner may desire that a convoy of ten nodes has a connection back to a specific enclave. The planner may not necessarily care which node provides the reachback and further if the chosen node somehow failed, the planner would want another node to automatically assume the reachback function.

The distributed networking agent is developing a language that will allow the planner to specify these goals. As an example: the convoy should be well connected between themselves and there may be a reachback from the Convoy to the Enclave. The distributed networking agents in the convoy realize they are a group and that they as a group have a goal to reachback to the enclave. One node is elected to perform this function and if for any reason, this node fails; the group will ensure that another distributed networking agent is chosen to fulfill this goal.

The container concept extends to other areas. The planner will add some resources for particular reasons. For instance an UAV may be added to increase connectivity for a group of nodes within a container or it may be added to interconnect two separate groups of nodes. It is important that the distributed networking agent understands the planner's intent in order to use the resource correctly. The Access list for the resource can be set not only for particular nodes, but also for the type of link. The distributed networking agent understands if a connection is within a grouping or between groupings. For example, a certain resource may only be used if the connection is between groupings.

The container concept matches other natural networking groupings. For example, OSPF areas may be important containers for the distributed networking agent. The planner may want good connectivity between area zero and all other OPSPF areas. The planner may also want radio links to connect areas at border gateway routers. In mobile Ad Hoc networks, domain reconfiguration and the configuration in real-time of border gateway routers will be required. The layer one topology needs to be consistent with the layer three topology and containers may allow the distributed networking agent to understand these constraints.

Complex plans may require hierarchical views. At the highest level, the planner may be concerned with connecting enclaves and convoys. The behavior of individual nodes may need to be abstracted and aggregated in order for the information to be comprehended. The planner at the highest level may desire to delegate detailed planning of portions of the plan to others. The container concepts allows for these hierarchical views to be consistent throughout all levels. This hierarchical grouping concept also helps the scaling of the distributed networking agent process, the information exchanged within a group is naturally richer than information between groups.

Policy

Policy is the second tool used to meet the planners' intent. The distributed networking agent may be configured to aggregate detailed configuration information into intuitive groupings. As an example, the behavior of the initial connectivity algorithm may be dependent upon the initial connectivity goal (0, 1, 2 etc.), a number of timers (how long to wait before testing, how long to wait after a failed connection, etc.) and priority. These values may be grouped into intuitive settings, aggressive, conservative and normal. According to one embodiment of the invention, the planner can set the distributed networking agent behavior without understanding details of the algorithms interaction. FIG. 6 shows a screen shot 690 for an initial concept for the policy implementation.

The network administrator system may be responsible for network planning and asset allocation. Policy may be designed on the network administrator system's terminal and distributed to each node. The network administrator system's policy includes both the initial COI and asset allocation. Asset allocation may include UAVs and Satellite assets, frequency allocations and battle plans. The data in the initial COI table will govern the ordering of initial link establishment. The COI table is updateable through the network administrator system's interface. Asset allocation may include valid frequency ranges, available satellite assets and scheduling information. The Link decision agent may access this information from the knowledge base.

Status

An exemplary embodiment of the distributed networking agent has been tested with OPNET simulations of up to 50 nodes and has been tested with 44 node open rack configuration. An open rack configuration is illustrated in FIG. 12. The open rack configuration may be configured to test for the impacts of fragments. Additionally, the open rack tests impact for degraded links, packet loss and latency. Open racks may be configured to simply measure traffic and overhead. Various radios maybe integrated into the network for example control plane radios, directional line of sight, multiple access via UAV and terrestrial relay and multiple access satellite bands.

Relay Administrator

The Relay administrator may be configured to manage both relays and shared assets that are assigned by the network administrator system. The Relay Administrator may also be responsible for allocating relay assets as requested by distributed networking agent instances. A "shared asset" may be defined as a resource (i.e. UAV, satellite, or RTT) that can be used by any node to communicate with any other node when there is not the capability to have a direct connection (cable or terrestrial LOS) between the two nodes. A "relay" is provides communication between two nodes which has an "A" end point and a "Z" end point, and it can be made up of a single shared asset or multiple shared assets. Link Decision communicates with Relay Administrator to calculate and coordinate the link costs of the link as control messages pass between Link Decision and Relay Administrator. The messages from Link Decision to Relay Administrator include Relay Requests, Relay Extensions, and Relay Releases. Once the negotiations complete between Link Decision and Relay Administrator, Link Decision decides to connect via particular radio type and passes this information to Link Negotiator as the two nodes attempt to form a link between them. An exemplary relay administrator specification is illustrated in FIG. 10.

Link Negotiator Interface

The Link Decision process may pass the link negotiator the data to connect the links that were validated by the Path Profiler process. The Link Negotiator may return a pass-fail indication to the Link Decision process. In the event that a link fails to be established, the decision table may attempt to use the next best Frequency pair or next best link as assigned by the path profiler process. In the event that no other possibilities exist the Link Decision will attempt the entire list of possibilities until successful.

The distributed networking agent may be developed on a software platform. The distributed networking agent may reside on tactical communication elements and control the radios in the nodes of the system. The distributed networking agent may be configured to access data from the radios, the networking equipment, as well as other external information, including environment-specific information and situational awareness information to intelligently create an efficient radio topology. In one specific implementation of the distributed networking agent and network according to one embodiment of the present invention, the environment-specific information may include information related to battle commands and the situational awareness data may include battle field information.

In various embodiments of the invention, the distributed networking agent may be configured to perform real time optimization of a dynamic ad hoc network based on information and data related to traffic flow. Additionally, in some embodiments of the invention, the distributed networking agent may be configured to optimize the dynamic ad hoc network based on single points of failure. In additional embodiments of the invention, various algorithms may be utilized by the distributed networking agent to make decisions related to network topology. For example, the distributed networking agent may include a number of different modes, including a top talker mode and a strong backbone mode. In each of these modes, one problem that is addressed by this embodiment of the present invention is how to quantify network performance. In designing a distributed networking agent that may mimic a network planner's intuition, the resulting distributed networking agent may be configured to compare and react to the network performance.

In an embodiment of the invention using the top talker embodiment, the top talkers may be configured to quantify the impact of the network traffic by multiplying the source and destination traffic by the network cost over the path to transmit the traffic. In this way the disperse communicating nodes may be evaluated as to impact to network performance and resources may be allocated to the nodes. The strong backbone mode may be configured to quantify the impact of a single point of failure within the network so that the worst impact failure may be improved first by the distributed networking agent.

The link negotiator may be configured to pass suggested links and channels between nodes. The link negotiator may be configured to interface, via the knowledge base, to the cosite analyzer for choosing optimum channel(s). Additionally, the link negotiator may be configured to pass final link made information to, for example, directories or other data structures.

The Cosite Mitigation Subsystem

ICD for Cosite Analysis Software: Cosite analysis software may include the information required to host the software, processor type and speed, memory and other resources required. It may also identify the information flow and any formatting or data structures.

Cosite Analysis Software. This software may include modifications to Cosite Analysis Software tools in order to make them into a module which can be interfaced with the distributed networking agent. This software may be configured to use preloaded data from the cosite analysis of various network nodes, current status of all transmitters and spectrum information from the EMI "sniffer". This software may accept a number of frequencies and rate each of these frequencies with a metric that corresponds to the expected amount of cosite interference. The cosite analysis software may be employed on various types of hardware as will be apparent to those skilled in the art. This hardware includes various processors and data processing hardware, and memory devices.

EMI Sniffer. The EMI sniffer is device that may be configured to sample the frequency range of interest and calculate an in-band energy level. This information may be input into the Cosite Analysis Software. This information may also be available for reading by the node manager. The Cosite Analysis Software may be hosted on the EMI sniffer. The EMI sniffer may be configured to support EMI sniffing through Ka Band. FIG. 7 shows the interaction of these modules. The spectrum sniffer 702 is connected to the external antenna 720 of choice. The frequency manager 704 interfaces to the network administrator system for preplanned data and list of frequencies. As shown in FIG. 7, cosite analysis algorithms may use an EMI sniffer to determine the local spectrum availability. The cosite analysis may be configured to use Cosite Interference design information and current local spectrum to test and measure the potential channels.

FIG. 8 illustrates an EMI sniffer according to another aspect of the present invention. Additionally FIG. 8 shows the functionality of the distributed networking agent at a cosite in the network topology. Another aspect of a distributed networking agent according to various embodiment of the present invention is the utilization of an EMI sniffer. In one embodiment of the present invention, an EMI sniffer may be configured to permit aggressive frequency reuse by testing the environment through a small directional antenna. In one specific implementation of the present invention, this testing may be performed in real-time. The information received by the sniffer may be shared between the communicating nodes via the distributed networking agent spectrum management algorithms. This may allow the same frequency channels to be used in close physical approximation, when the antenna provides directional separation.

As illustrated in FIG. 8, the sniffer may be used in connection with cosite analysis software. When the sniffer and the cosite evaluation software are used in combination with the distributed networking agent spectrum management algorithms, the network may be configured to employ an aggressive reuse capability. Through the use of a sniffer according to various embodiments of the present invention in connection with a distributed networking agent, the real-time distributed smart agent evaluates potential radio links. This system may use integrated planning tools for loss of sight (LOS) links, terrestrial relay links, UAV links and satellite links. In one embodiment, a system of the present invention may utilize a low data rate, long-range control plane to transfer geo-location between mobile nodes in order to permit the distributed networking agent to plan and choose optimum radio links in real-time. The present invention may also utilize planned traffic flows and real-time measured traffic flows in order to optimize the network topology.

In some embodiments, the distributed nature of the distributed networking agent may allow processing intensive algorithms to be accomplished in near-real time. This distributed approach may also allow innovative modeling of the problem space (e.g., a geographical environment) where each note may independently attempt to meet predetermined goals for that node. The resulting behavior, however, may meet network-wide goals.

A block diagram of the EMI Sniffer is shown in FIG. 7. According to a specific implantation of the EMI sniffer the EMI sniffer may be embodied as a single 19"EIA rack mountable unit (5.25" high, 22" deep) that includes the following items: (1) a Receiver; (2) Controller Module; (3) 10 position RF Switch; and (4) Directional Couplers. The EMI Sniffer may be configured to connect to the system as shown in FIG. 7. The directional couplers allow samples to be taken directly from network antennas. The network may include 10 dB couplers, for example, which may enable the receiver to monitor near system input levels with low loss (<1 dB). The RF switch may be used to select which antenna to monitor, with 3 spare ports that can be used for future expansion.

Transition time of the RF switch may be about 15 ms although an acceptable switch may be used that does not meet such a design criteria. Total time acquire a channel sample and report channel quality is not specified, but it should be noted that the intent of the EMI sniffer is not to perform real-time signal capture, nor to characterize channels quickly enough to enable rapid network frequency changes (i.e. hopping). The channel characterization time may vary depending on the number of channels, and will most likely take several seconds.

The EMI sniffer may be configured to use the reverse power port of the directional couplers to sample receive signals from the antenna with the receiver. The receiver may be protected from damage from receive signals of approximately 1 Watt, or transmit levels up to 100 W. The receiver may be protected from desensitization by bandpass filters. No additional cosite mitigation filtering need be provided in the EMI Sniffer to prevent desensitization from off-platform interferers that fall within the bandpass filter bands.

According to a specific embodiment of the present invention, the EMI Sniffer may be configured to host more than one software program on a single board PC. These software programs may include programs for cosite modeling and control and signal processing for the receiver. These programs may be modified to run together and interface to a network control system. This interface may be, for example, a Universal Serial Bus (USB).

Automatic Keyline Detection: The EMI Sniffer may be configured to directly connect in line to sample received energy from antennas within the network. If the receiver is monitoring a radio that is transmitting, the receiver may be desensitized and not be able to report accurate results. If network radio keylines are provided to the EMI Sniffer, the sniffer may be set to monitor the keylines and automatically scan channels that are in receive mode only. Monitoring TX emitters could still be commanded as a BIT function.

Status Reporting/Monitor: The EMI sniffer controller module may be embodied as a single board PC with capability of operation with keyboard and CRT display. If desired, a CRT could be connected to the EMI sniffer to display channel status or spectral information for demonstration or analysis purposes.

Embedded CMD Filtering: According to yet another embodiment of the present invention the EMI sniffer may include a bandpass CMD filtering mechanism. This may simplify the system by lowering the number of line replaceable units (LRU) and interconnect cables.

While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

We claim:

1. Processor-readable software code stored on a processor-readable medium, the code comprising code to:
   cause a wireless communication node of a network that includes a plurality of wireless communication nodes to receive information from a network administrator that identifies a planned link between the wireless communication node and a destination node of the network, wherein the information includes an identification of the destination node;
   establish connectivity for the planned link between the communication node and the destination node;
   determine whether an additional link should be added to the network based on a link priority associated with the additional link, wherein the additional link is a link between the wireless communication node and another node of the network, and the additional link is not specified by the network administrator; and when the additional link should be added to the network, establish connectivity for the additional link, the connectivity for the additional link being based on the link priority associated with the additional link, and wherein the link priority is based on the following equation: Link Priority=$\beta$*Old Link Priority+$(1-\beta)$ New Link Priority, where $\beta$ is associated with a network plan.

2. The processor-readable software code of claim 1, wherein a pre-planned link of the one or more pre-planned links is associated with a node outside of a control plane.

3. The processor-readable software code of claim 1, further comprising:

determining that a lower priority link should be removed from the network when resources for the additional link are not available.

4. The processor-readable software code of clam 1, wherein the link priority is defined as: $\alpha$*Separation Value $\beta$*Link Utilization+$\delta$*COI+$\gamma$*NeedLine+$\epsilon$*Role Priority, where $\alpha$, $\beta$, $\delta$, $\gamma$, $\epsilon$ are associated with the network plan.

5. The processor-readable software code of claim 4, wherein priority is given to existing links at least in part by setting the separation value and Link Utilization of new links to zero.

6. The processor-readable software code of claim 4, wherein priority is given to existing links at least in part by setting the Separation Value, Link Utilization, Needline, and Role Priority to zero.

7. A method, implemented in a wireless communication node, for forming a network, the method comprising:

interfacing with an electromagnetic interference (EMI) sniffer of the communication node to determine spectrum availability within the network;

receiving information from a network administrator that identifies a planned link between the wireless communication node and a destination node of the network, wherein the information includes an identification of the destination node;

establishing connectivity for the planned link between the communication node and the destination node based on the spectrum availability;

making a determination of whether to add an additional link to the network based on an ability of the additional link to lower an impact of a high traffic load between a particular source node and a particular destination node;

when the determination is made to add the additional link, initiating the additional link to minimize the impact of the high traffic load on the network; and implementing a defragment algorithm, the defragment algorithm being configured to analyze an existing network topology and determine if all discovered nodes are part of the existing network topology, wherein the defragment algorithm is configured to calculate a score associated with a prospective link to a node not within a network fragment, and wherein the score is: $\alpha$*Distance+$\beta$*COI+$\delta$*Mobility value, where $\alpha$, $\beta$ and $\delta$ are predetermined values established by a network policy.

8. The method of claim 7, further comprising generating an interference profile associated with a radio within the network.

9. The method of claim 7, further comprising sampling, by the EMI sniffer an available spectrum using antennas.

10. The method of claim 7, further comprising updating a table based on one of an availability or unavailability of a network resource.

11. The method of claim 7, further comprising receiving an asset discovery message from a remote node.

12. The method of claim 7, further comprising running a healing algorithm, the healing algorithm being configured to connect at least two fragmented networks.

13. A method performed within a wireless communication node of a network that includes a network administrator system and a plurality of wireless communication nodes, the method comprising:

receiving information from the network administrator system that identifies one or more pre-planned links between the wireless communication node and one or more destination nodes of the network, wherein the information includes identification of the destination nodes;

establishing connectivity for the pre-planned links between the communication node and the destination nodes;

determining whether a number of the pre-planned links established meets a connectivity goal for the wireless communication node;

when the number of pre-planned links established does not meet the connectivity goal, determining that an additional link, which is not specified by the network administrator system, should be added to the network, wherein the additional link is a link between the wireless communication node and another node of the network, and wherein determining that the additional link should be added includes determining that the additional link should be added to the network based on a link priority associated with the additional link;

determining whether assets are available to establish the additional link;

when the assets are not available to establish the additional link, establishing connectivity for the additional link using assets of an existing link, the connectivity for the additional link being based on the link priority associated with the additional link, and wherein the link priority is based on the following equation: Link Priority=$\beta$*Old Link Priority+$(1-\beta)$ New Link Priority, where $\beta$ is associated with a network plan.

14. The method of claim 13, wherein a pre-planned link of the one or more pre-planned links is associated with a node outside of a control plane.

15. The method of claim 13, wherein a number of pre-planned links is substantially less than a number of non-planned links.

16. The method of claim 13, wherein the additional link has a higher priority than a priority of the existing link.

* * * * *

UNITED STATES PATENT AND TRADEMARK OFFICE
CERTIFICATE OF CORRECTION

| | |
|---|---|
| PATENT NO. | : 7,742,436 B2 |
| APPLICATION NO. | : 11/217677 |
| DATED | : June 22, 2010 |
| INVENTOR(S) | : Steve Carillo et al. |

It is certified that error appears in the above-identified patent and that said Letters Patent is hereby corrected as shown below:

Column 41, line 18, "clam" should be changed to --claim--.

Signed and Sealed this

Twenty-first Day of September, 2010

David J. Kappos
*Director of the United States Patent and Trademark Office*